(12) United States Patent
Yamanaka

(10) Patent No.: US 12,158,568 B2
(45) Date of Patent: Dec. 3, 2024

(54) ZOOM LENS AND IMAGING APPARATUS

(71) Applicant: TAMRON CO., LTD., Saitama (JP)

(72) Inventor: Hisayuki Yamanaka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 202 days.

(21) Appl. No.: 17/735,677

(22) Filed: May 3, 2022

(65) Prior Publication Data

US 2023/0003984 A1   Jan. 5, 2023

(30) Foreign Application Priority Data

Jun. 28, 2021 (JP) ................. 2021-106602

(51) Int. Cl.
*G02B 15/14* (2006.01)
*G02B 13/00* (2006.01)
*G02B 13/02* (2006.01)
*G03B 5/02* (2021.01)

(52) U.S. Cl.
CPC ... *G02B 15/145105* (2019.08); *G02B 13/006* (2013.01); *G02B 13/02* (2013.01); *G03B 5/02* (2013.01)

(58) Field of Classification Search
CPC ............. G02B 13/006; G02B 13/02; G02B 15/145105; G02B 15/145121; G02B 15/16; G03B 5/02
See application file for complete search history.

(56) References Cited

FOREIGN PATENT DOCUMENTS

JP        2020-197600 A    12/2020
WO   WO 2017/099243 A1     6/2017

*Primary Examiner* — Jack Dinh
(74) *Attorney, Agent, or Firm* — Paratus Law Group, PLLC

(57) ABSTRACT

Provided are: a zoom lens including, in order from an object side, a first lens group having positive refractive power, a second lens group having negative refractive power, an Intermediate group having one or more lens groups and having positive refractive power as a whole, a lens group having negative refractive power, and a rear group having one or more lens groups, wherein the intermediate group includes at least two lens surfaces each of which is a cemented surface and is a diverging surface, a space between adjacent lens groups changes in zooming, the lens group moves on an optical axis in focusing, and the zoom lens satisfies the predetermined conditional expression; and an imaging apparatus including the zoom lens.

12 Claims, 24 Drawing Sheets

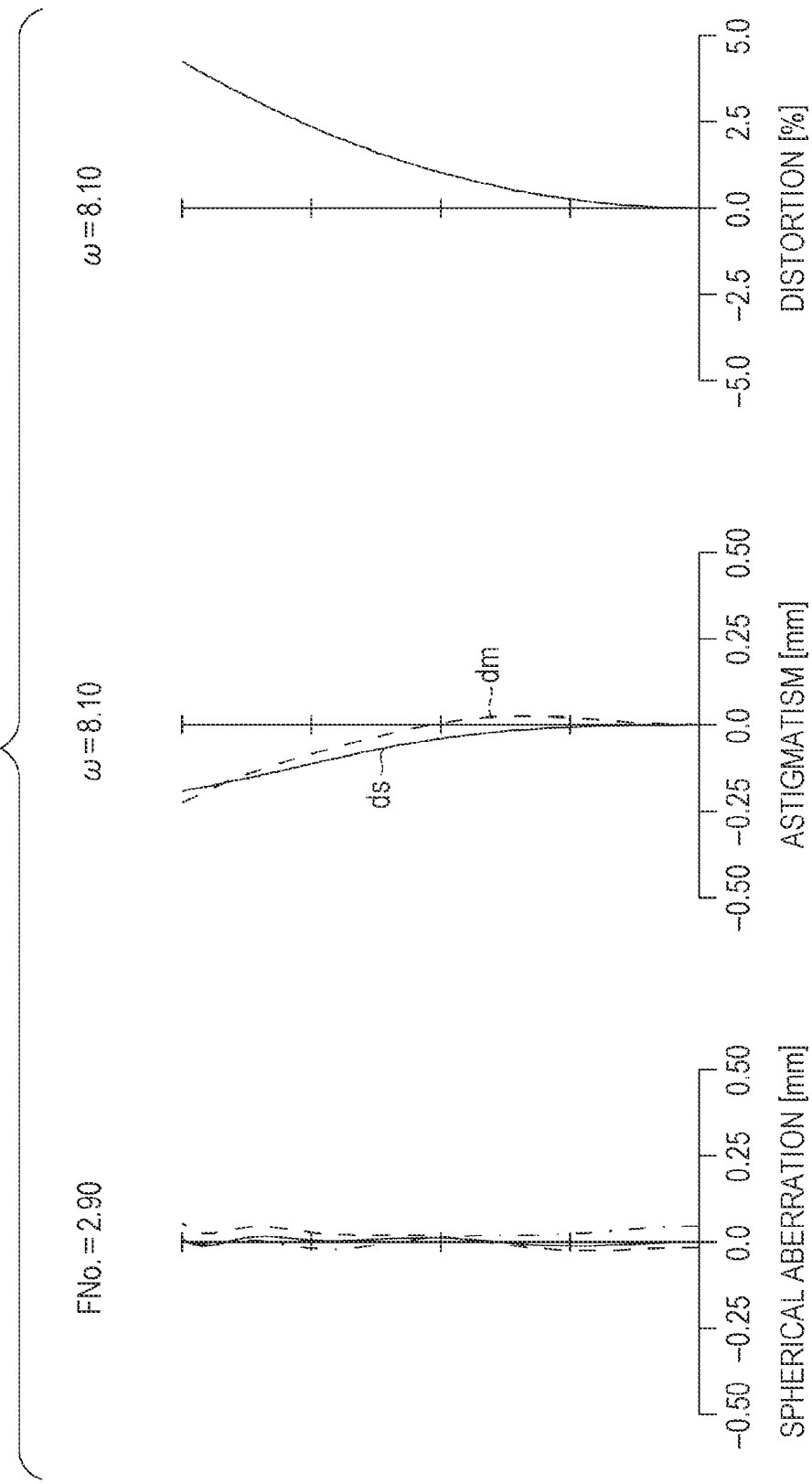

ZOOM LENS AND IMAGING APPARATUS

CROSS-REFERENCE TO RELATED APPLICATIONS

This application is based on and claims the benefit of priority from Japanese Patent Application No. 2021-106602, filed on Jun. 28, 2021, the entire contents of which are incorporated herein by reference.

BACKGROUND OF THE INVENTION

Technical Field

The present invention relates to a zoom lens and an imaging apparatus.

Related Art

Imaging apparatuses including solid state image sensors, such as digital still cameras and digital video cameras, have been widely used. Examples of such an imaging apparatus include various devices such as a digital still camera, a digital video camera, a broadcast camera, a surveillance camera, and an in-vehicle camera. There is a strong market demand for a zoom lens having a large aperture ratio and high optical performance in any imaging apparatuses.

As an optical configuration of the zoom lens, for example, a positive-lead type configuration including a lens group having positive refractive power at a position closest to the object is known. In a positive-lead type zoom lens, generally, strong negative refractive power is disposed in the second lens group that is second closest to the object, and a large variable magnification burden is imposed on the second lens group, so that it is easy to realize high variable magnification. In such a positive-lead type zoom lens, the telephoto tendency is strong, so that the overall optical length can be shortened as compared with the focal length.

Here, in order to obtain a zoom lens having a small F value and high optical performance, it is necessary to satisfactorily correct various aberrations caused by a large aperture ratio. Therefore, in the zoom lens having a small F value, it is difficult to dispose strong refractive power in each lens Group as compared with the zoom lens having a large F value, and the entire system tends to be enlarged. In order to obtain a zoom lens with a small F value, it is preferable to dispose a lens group having strong positive refractive power on the image side, that is, at the rear of the entire system. However, when a lens group having strong positive refractive power is disposed at the rear of the entire system, it is difficult to obtain a zoom lens having a strong telephoto tendency, and it is difficult to shorten the overall optical length. As described above, in order to achieve a zoom lens having high optical performance and a small size while achieving a large aperture ratio, it is necessary to appropriately set the power arrangement, imaging magnification, lens configuration, and the like of each lens group.

Furthermore, in recent years, digital still cameras and the like that capture images by live view images have become widespread. During live view imaging, a subject is focused by an image plane phase difference AF method or a contrast AF method. Specifically, in the contrast AF method, the subject is focused while constantly moving the focus group. Furthermore, in recent years, digital still cameras and the like employing tracking AF have been widely used. The tracking AF refers to an autofocus function that, after focusing on a subject to be imaged once, keeps focusing on the subject at all times while moving a focus group according to movement of the subject.

In a case of capturing a moving image or the like using contrast AF or tracking AF as described above, there is a phenomenon in which the size of the subject on the imaging plane changes as the focus group moves. In a case where the change in the image magnification due to the movement of the focus group is large, the imaging person observing the live view image feels uncomfortable. It is known that this change in image magnification increases as the focus group is disposed on the object side of the optical system, that is, at the front of the optical system. Therefore, it is necessary to appropriately set the arrangement of the focus group.

Currently, the following zoom lens is known. For example, WO 2017/99243 A discloses a bright zoom lens including a lens Group having positive, negative, positive, negative, and positive refractive powers in order from the object side, and having an F value of about F1.9 to F2.8. However, in this zoom lens, since the combined refractive power from the first lens group to the third lens group is weak, and a lens group having strong positive refractive power is disposed at the rear of the entire system, sufficient miniaturization is not realized.

JP 2020-197600 A discloses a bright zoom lens including a lens group having positive, negative, positive, negative, and positive refractive powers in order from the object side, and having an F value of about F2.8. However, in this zoom lens, the second lens group closer to the object than the stop is set as the focus group. That is, since the focus group is disposed at the front of the entire system, there is a problem that a change in the image magnification is large, which is not preferable to tracking AF and contrast AF. In addition, the second lens group is relatively heavy, and when contrast AF is used, it is difficult for the zoom lens to perform quick focusing due to the weight of the focus group.

The present invention has been made in view of the above problems, and an object of the present invention is to provide a zoom lens that is small as a whole, and excellent optical performance while having a large aperture ratio, and an imaging apparatus including the zoom lens.

SUMMARY OF THE INVENTION

In order to solve the above problems, a zoom lens according to the present invention includes, in order from an object side, a first lens group having positive refractive power, a second lens group having negative refractive power, an intermediate group N having one or more lens groups and having positive refractive power as a whole, a lens group F having negative refractive power, and a rear group R having one or more lens groups, wherein the intermediate group M includes at least two lens surfaces Si each of which is a cemented surface and is a diverging surface, a space between adjacent lens groups changes in zooming, the lens group F moves on an optical axis in focusing, and the zoom lens satisfies following Conditional Expression:

$$0.50 \leq \Sigma\varphi i/\varphi m \leq 1.50 \qquad (1)$$

$$0.85 \leq Fnom \leq 1.40 \qquad (2)$$

where $\Sigma\varphi i$ is a sum of refractive power of the lens surfaces Si included in the intermediate group M, where for each lens surface Si (i=1, 2, . . . ) included in the intermediate group M, when refractive indexes of media before and after each lens surface Si with respect to d Line are Nfi and Nbi, and a radius of curvature of each lens surface Si is Ri, refractive power of each lens surface Si is φi=|(Nfi−Nbi)/Ri|(i=1, 2, . . . ), φm is a combined refractive power of the intermediate group M at the telephoto end and is a value obtained by φm=1/fm, fm is a composite focal length of the intermediate Group M at the telephoto end, and Fnom is an F value from the first lens group to the intermediate group M and is a minimum value in an entire zoom region.

In order to solve the above problems, an imaging apparatus according to the present invention includes the zoom lens and an image sensor that converts an optical image formed by the zoom lens into an electrical signal.

According to the present invention, it is possible to provide a zoom lens that is small as a whole and has excellent optical performance while having a large aperture ratio, and an imaging apparatus including the zoom lens.

BRIEF DESCRIPTION OF THE DRAWINGS

FIG. 24 is a spherical aberration diagram, an astigmatism diagram, and a distortion diagram at the telephoto end of the zoom lens of Example 6 in an in-focus state on infinity.

DESCRIPTION OF THE EMBODIMENTS

Figure 1:
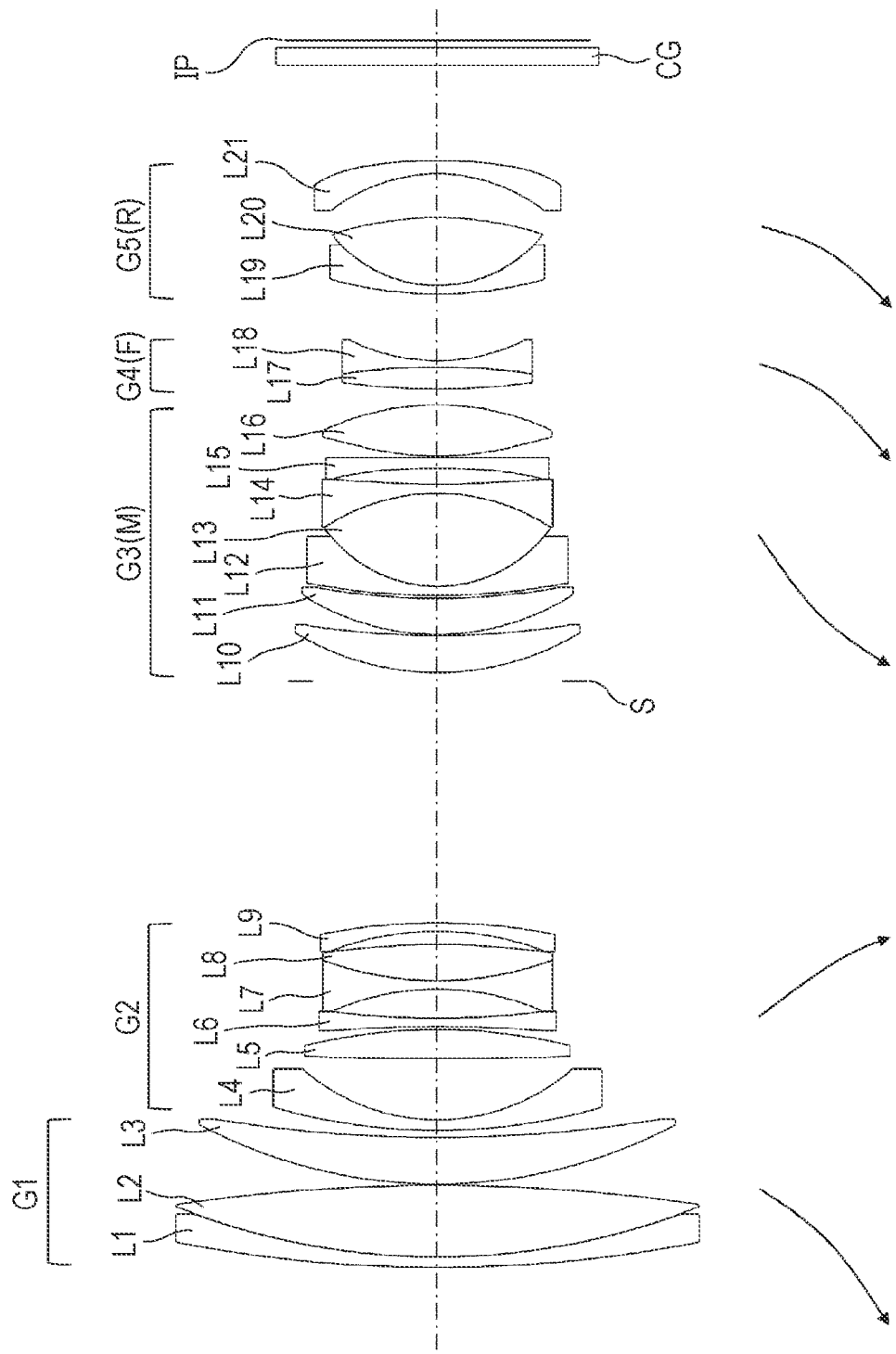
FIG. 1 is a lens cross-sectional view at a wide-angle end of a zoom lens according to Example 1.

Hereinafter, embodiments of a zoom lens and an imaging apparatus according to the present invention will be described. However, the zoom lens and the imaging apparatus described below are an aspect of the zoom lens and the imaging apparatus according to the present invention, and the zoom lens and the imaging apparatus according to the present invention are not limited to the following aspects.

1. Zoom Lens 1-1. Optical Configuration

The zoom lens according to the present embodiment includes, in order from the object side, a first lens group having positive refractive power, a second lens group having negative refractive power, an intermediate group M having one or more lens groups and having positive refractive power as a whole, a lens group F having negative refractive power, and a rear group R having one or more lens groups. Hereinafter, an optical configuration of the zoom lens will be described.

(1) First Lens Group

A specific lens configuration of the first lens group is not particularly limited as long as the first lens group has positive refractive power as a whole. For example, when two positive lenses are included, strong positive refractive power can be disposed in the first lens group. In this case, it is possible to enhance the telephoto tendency at the telephoto end while achieving the high variable magnification ratio, and it is easy to miniaturize the entire system. Note that the strong telephoto tendency means that the value of the telephoto ratio indicates a smaller value. In addition, a configuration including at least one negative lens facilitates correction of a spherical aberration, a chromatic aberration, and the like, which is more preferable for realizing a zoom lens having excellent optical performance.

(2) Second Lens Group

A specific lens configuration of the second lens Group is not particularly limited as long as the second lens group has negative refractive power as a whole. For example, in a configuration including two or more negative lenses and one or more positive lenses, strong negative refractive power can be disposed in the second lens group. In this case, it is easy to increase the variable magnification ratio of the second lens group, and it is easy to realize excellent optical performance while achieving a high variable magnification ratio. Preferably, the lens surface, closest to the object, of the second lens group is convex toward the object. This makes it easy to satisfactorily correct the field curvature at the wide-angle end.

(3) Intermediate Group M

The intermediate group N includes one or more lens groups and has positive refractive power as a whole. The intermediate group N includes one or more lens groups disposed between the second lens group and the lens group F. In order to realize a zoom lens having a large aperture ratio and a small size, it is preferable to dispose strong positive refractive power in the intermediate group M to converge the pencil of light. In a case where strong positive refractive power is disposed in the intermediate Group M, it is necessary to correct a spherical aberration and a field curvature in an under direction generated in the intermediate group M by a strong divergence action. Therefore, in the zoom lens, by disposing at least two or more lens surfaces Si each of which is a cemented surface and a diverging surface in the intermediate group M, it is possible to satisfactorily correct the spherical aberration and the field curvature in the under direction by a strong divergence action while disposing relatively strong positive refractive power in the intermediate group M, and the zoom lens which is small as a whole and has excellent optical performance while having a large aperture ratio is realized. In the intermediate group N, the divergence action may be obtained by the lens surface of the negative single lens, but in this case, higher-order aberration is likely to occur, and the eccentricity sensitivity between the lenses is increased. Therefore, by imparting the divergence action to the cemented surface of the cemented lens in which two or more lenses are cemented, it is easy to achieve both miniaturization and excellent optical performance.

At least one of the two or more lens surfaces Si disposed in the intermediate group M is preferably convex toward the object. With this configuration, it is easy to satisfactorily correct the field curvature in the entire zoom region. In addition, the lens surface Si may be a cemented surface and a diverging surface. The intermediate group M may include two or more cemented lenses including one lens surface Si, or may include one or more cemented lenses including two lens surfaces Si, and a specific configuration thereof is not particularly limited as long as the intermediate group M includes two or more lens surfaces Si.

When the lens constituting each lens surface Si is a lens LCn (n=1, 2, 3, . . . ), the refractive power φLCn of each lens LCn preferably satisfies φLCn≥0.005. With this configuration, it is easy to enhance the divergence action of the lens surface Si. The refractive power φLCn is defined by the following equation:

$$\varphi LCn=|(NLCn-1)(1/LCnR1-1/LCnR2)|$$

where NLCn is a refractive index of the material of Sic lens LCn with respect to d Line, LCnR1 is a radius of curvature of object side face of the lens LCn, and LCnR2 is a radius of curvature of the image side face of the lens LCn, where when the center of curvature of the lens surface is closer to the image than the lens surface, the sign of the radius of curvature is set to positive, and when the center of curvature of the lens surface is closer to the object than the lens surface, the sign of the radius of curvature is set to negative. The sign of the radius of curvature is the same for other conditional expressions.

In the lens surfaces Si, i=1, 2, . . . , and "i" represents the arrangement order of the lens surfaces Si from the object side in the intermediate group M. In lens LCn, n=1, 2, 3, . . . , and it represents the arrangement order of lenses LCn constituting lens surfaces Si from the object side.

It is preferable that the intermediate group M has a positive lens at a position closest to the object. Such a configuration facilitates miniaturization of the entire system. The positive lens is more preferably a positive meniscus lens with a convex surface facing an object. With such a configuration, it is further easy to reduce the diameter of the intermediate group M.

It is preferable that the intermediate group M has the positive lens at a position closest to the image. At this time, the image side face of the positive lens is preferably convex toward the image. This makes it easy to secure a bright F value in the entire zoom lens system.

The intermediate group M preferably has at least one air lens having negative refractive power. As a result, the divergence action in the intermediate group M can be easily secured, and the spherical aberration and the field curvature can be easily corrected more satisfactorily. Note that the refractive power of the air lens generates negative refractive power or positive refractive power depending on the shape between lens surfaces disposed adjacent to each other with an air space. Since the zoom lens includes an air lens having negative refractive power, the air lens has a shape similar to that of a positive lens having a biconvex shape, a planoconvex shape, or a positive meniscus shape.

Tn addition, in a case where the intermediate Group M includes two or more lens groups, it is easy to suppress the aberration fluctuation by changing the space between the adjacent lens groups on the optical axis in zooming, so that a zoom lens with higher optical performance can be obtained. However, when the number of lens groups constituting the intermediate group N increases, it is difficult to obtain a compact zoom lens. Therefore, in order to obtain a compact zoom lens, the number of lens groups constituting the intermediate group M is preferably 3 or less.

(4) Lens Group F

The lens group F is a focus group that moves on the optical axis in focusing. Since the pencil of light converged by the intermediate group N is incident on the lens group F disposed on the image side of the intermediate group N, it is easy to have a small lens diameter and a lightweight configuration. Therefore, by making the lens group F a focus group, high-speed autofocus can be realized, and the load of the focus drive system can be easily reduced. A specific lens configuration of the lens group F is not particularly limited as long as the lens group F has negative refractive power as a whole, but it is more preferable that the lens group F is composed of only a cemented lens in which one negative lens and one positive lens are cemented. With such a configuration, it is easy to realize high-speed autofocus by reducing the weight of the focus group and to obtain a high-performance zoom lens in which various aberrations such as spherical aberration and a chromatic aberration are satisfactorily corrected over the entire object distance.

(5) Rear Group R

The rear group R includes at least one lens group. The rear group R includes a lens group disposed between the lens group F and the image plane. The rear group R preferably has at least one lens group with negative refractive power and preferably has negative refractive power as a whole. With such a configuration, it is easy to obtain a zoom lens having a stronger telephoto tendency at the telephoto end, and it is easy to shorten the overall optical length at the telephoto end. The rear group R may include two or more lens groups, but when the number of lens groups constituting the zoom lens increases, it is difficult to achieve miniaturization.

(6) Aperture Stop

The aperture stop is preferably disposed on the object side of the intermediate group M or in the intermediate group M. Specifically, by disposing it adjacent to the intermediate group M and closer to the object than the intermediate group M, it is easy to reduce the effective diameter of the first lens group at the wide-angle end.

1-2. Operation (1) Zooming

The zoom lens magnifies by changing a space between adjacent lens groups on an optical axis in zooming. In zooming, for each lens group, the space between the adjacent lens groups on the optical axis may be changed, and all the lens groups may move along the optical axis, or some of the lens Groups may be fixed in the optical axis direction.

The presence or absence of movement of each lens group is not particularly limited, but it is preferable that each of the first lens group, at least one lens group among the lens groups constituting the intermediate group M, and the lens group F move toward the object in zooming from the wide-angle end to the telephoto end. When these lens groups are moved in this way, the variable magnification effect of each lens group after the second lens group is less likely to be excessive, and both high variable magnification and high performance are easily achieved.

The second lens group preferably moves toward the image in zooming from the wide-angle end to the telephoto end. By moving the second lens Group toward the image, it is easy to suppress the lens outer diameter of the intermediate group M at the telephoto end, and it is easy to reduce the diameter of the stop unit and to reduce the size and weight of the zoom lens.

In a case where the rear group R includes a lens group having negative refractive power, the lens group having negative refractive power preferably moves toward the object in zooming from the wide angle end to the telephoto end. This movement in zooming can increase the variable magnification effect of the rear group R. Therefore, the amount of the movement of each lens group can be reduced, and it is easy to obtain a zoom lens that is more compact and has a high variable magnification ratio.

When the rear group R includes two or more lens groups, the lens group, of the rear group R, disposed at a position closest to the image is preferably fixed on the optical axis in zooming in order to avoid complication of the cam structure of the lens barrel.

(2) Focusing

The zoom lens performs focusing from infinity to a short distance by moving the lens group F to the image side along the optical axis. The lens group F is disposed on the image side of the intermediate group M, that is, at the rear of the zoom lens. Therefore, by making the lens group F a focus group, it is possible to suppress the variation in the angle of view accompanying the movement of the focus group.

Therefore, not only in the case of adopting the contrast AF method but also in the case of adopting the image plane phase difference AF method, it is possible to obtain a zoom lens suitable for capturing a moving image or the like using the tracking AF function.

1-3. Conditional Expression

The zoom lens desirably has the above-described configuration and satisfies at least one Conditional Expression described below.

$$0.50 \leq \Sigma \varphi i / \varphi m \leq 1.50 \quad (1)$$

where $\Sigma \varphi i$ is a sum of refractive power of lens surfaces Si included in intermediate group M, where for each lens surface Si (i=1, 2, . . . ) included in the intermediate group M, when refractive indexes of media before and after each lens surface Si with respect to d Line are Nfi and Nbi, and a radius of curvature of each lens surface Si is Ri, the refractive power of each lens surface Si is $\varphi i = |(Nfi - Nbi)/Ri| (i=1, 2, \ldots)$, $\varphi m$ is a combined refractive power of the intermediate group M at the telephoto end and is a value obtained by $\varphi m = /fm$, and fm is a composite focal length of the intermediate Group N at the telephoto end.

Conditional Expression (1) is a conditional expression for appropriately setting the sum of the refractive power of the lens surfaces Si included in the intermediate group M. When Conditional Expression (1) satisfied, the spherical aberration and the field curvature can be satisfactorily corrected over the entire zoom region due to the divergence action by the lens surface Si. Therefore, even when strong positive refractive power is disposed in the intermediate group M, it is possible to satisfactorily correct these aberrations, and to realize a compact zoom lens with high optical performance while achieving a large aperture ratio.

On the other hand, when the numerical value of Conditional Expression (1) is less than the lower limit value, the divergence action by the lens surface Si decreases. It is difficult to satisfactorily correct the spherical aberration and the field curvature that tend to be under when strong positive refractive power is disposed in the intermediate group M. Therefore, it is difficult to obtain a zoom lens that is compact and has high optical performance while achieving a large aperture ratio. On the other hand, when the numerical value of Conditional Expression (1) is the upper limit value or more, it is difficult to correct the spherical aberration and the field curvature in a well-balanced manner.

In order to obtain the above effect, the upper limit value of Conditional Expression (1) is preferably 1.40, and more preferably 1.30. The lower limit value of Conditional Expression (1) is preferably 0.55, and more preferably 0.60.

1-3-2. Conditional Expression (2)

$$0.85 \leq Fnom \leq 1.40 \quad (2)$$

where

Fnom is an F value from the first lens group to the intermediate group M and is a minimum value in the entire zoom region.

Conditional Expression (2) is a conditional expression for appropriately setting the minimum value in the entire zoom region as an F value from the first lens group to the intermediate group M. When Conditional Expression (2) is satisfied, it is easy to ensure desired brightness of the zoom lens. In addition, the above-described divergence action by the lens surfaces Si included in the intermediate group E can be maximized.

On the other hand, when the numerical value of Conditional Expression is less than the lower limit value, the F value from the first lens group to the intermediate group M is too small, and it is difficult to satisfactorily correct various aberrations. On the other hand, when the numerical value of Conditional Expression (2) exceeds the upper limit value, it is difficult to ensure desired brightness of the zoom lens. In this case, in order to obtain desired brightness, it is necessary to give strong positive refractive power Co the rear group R, and the telephoto tendency is weak, so that it is difficult to shorten the entire length.

In order to obtain the above effect, the upper limit value of Conditional Expression (2) is preferably 1.35, and more preferably 1.30. The lower limit value of Conditional Expression (2) is preferably 0.90, and more preferably 0.95.

1-3-3. Conditional Expression (3)

$$0.15 \leq Rmf/ft \leq 0.70 \qquad (3)$$

where

Rmf is a radius of curvature of the lens surface, closest to the object, of the intermediate group M and ft is a focal length of the zoom lens at the telephoto end.

Conditional Expression. (3) is a conditional expression for appropriately setting the ratio between the radius of curvature of the lens surface, closest to the object, of the intermediate group M and the focal length of the zoom lens at the telephoto end. When Conditional Expression (3) is satisfied, the lens surface, closest to the object, of the intermediate group M is convex toward the object. When Conditional Expression (3) is satisfied, it is easy to achieve a balance between reducing of the entire length and optical performance.

On the other hand, when the numerical value of Conditional Expression (3) is less than the lower limit value, it is easy to reduce the overall length, but the spherical aberration and the field curvature generated in the lens surface, closest to the object, of the intermediate group M tend to be under, and it is difficult to satisfactorily correct them. On the other hand, when the numerical value of Conditional Expression (3) exceeds the upper limit value, in order to obtain a small zoom lens while achieving a large aperture ratio, it is necessary to strongly converge the pencil of light in the intermediate group M, and thus, the number of lenses having positive refractive power disposed in the intermediate group M increases, and it is difficult to reduce the overall length.

In order to obtain the above effect, the upper limit value of Conditional Expression (3) is preferably 0.65, more preferably 0.6, and still more preferably 0.55. The lower limit value of Conditional Expression (3) is preferably 0.20, and more preferably 0.25.

1-3-4. Conditional Expression (4)

$$-0.80 \leq Rmb/ft \leq -0.15 \qquad (4)$$

where

Rmb is a radius of curvature of lens surface, closest to the image, of the intermediate group M and ft is a focal length of the zoom lens at the telephoto end.

Conditional Expression (4) is a conditional expression for appropriately setting the ratio between the radius of curvature of the lens surface, closest to the image, of the intermediate group M and the focal length of the zoom lens at the telephoto end. When Conditional Expression (4) is satisfied, the lens surface, closest to the image, of the intermediate group M is convex toward the image. When Conditional Expression (4) is satisfied, it is easy to reduce the overall length while ensuring the desired brightness of the zoom lens.

On the other hand, when the numerical value of Conditional Expression (4) is less than the lower limit value, it is difficult to secure the brightness from the first lens group to the intermediate group M. On the other hand, when the numerical value of Conditional Expression (4) exceeds the upper limit value, it is easy to reduce the overall length, but the curvature of the lens surface, closest to the mage, of the intermediate group M is too strong, and it is difficult to satisfactorily correct the spherical aberration and the field curvature.

In order to obtain the above effect, the upper limit value of Conditional Express Expression (4) is preferably −0.20, and more preferably −0.25. The lower limit value of Conditional Expression (4) is preferably −0.75, more preferably −0.70, and still more preferably −0.65.

1-3-5. Conditional Expression (5) and Conditional Expression (6)

It is preferable that the intermediate group M has a positive lens P at a position closest to the object, and the positive lens P simultaneously satisfies following Conditional Expressions (5) and (6):

$$0.01 \leq \theta gF - (-1.618 \times 10^{-3} \times vd + 0.6415) \leq 0.06 \qquad (5)$$

$$10 \leq vd \leq 35 \qquad (6)$$

where when the refractive indexes of the material of the positive lens P with respect to d Line, F Line, C sine, and g Line are nd, nF, nC, and ng, respectively, θgF is a partial dispersion ratio θgF=(ng−nF)/(nF−nC) of the material of the positive lens P with respect to g Line and F Line, and vd is an Abbe number vd=(nd−1)/(nF−nC) of the material of positive lens P with respect to d Line.

Conditional Expression (5) is a conditional expression for defining the anomalous dispersibility of the material of the positive lens P. Conditional Expression (6) is a conditional expression for defining the Abbe number of the material of the positive lens P with respect to d Line. When the intermediate group M has the positive lens P that simultaneously satisfies Conditional Expression (5) and Conditional Expression (6) at position closest to the object, the longitudinal chromatic aberration can be satisfactorily corrected in the entire zoom region. In general, a positive lens included in a lens group having positive refractive power corrects the chromatic aberration by using a material with low dispersion. However, in the intermediate group M of the zoom lens, the divergence action by a diverging surface is large, and the longitudinal chromatic aberration on a short wavelength side tends to be over. Therefore, by using the positive lens P made of the material with the high dispersion, the favorable chromatic aberration correction is easy.

On the other hand, when the numerical value of Conditional Expression (5) is less than the lower limit or the numerical value of Conditional Expression (6) exceeds the upper limit, the longitudinal chromatic aberration of F Line, g Line, and the like on the short wavelength side tends to be over, and the correction is difficult. On the other hand, when the numerical value of Conditional Expression (5) exceeds the upper limit value or the numerical value of Conditional Expression (6) is less than the lower limit, the longitudinal chromatic aberration of F Line, g Line, and the like on the short wavelength side tends to be under, and the correction is difficult.

In order to obtain the above effect, the upper limit value of Conditional Expression (5) is preferably 0.05. The lower limit value of Conditional Expression (5) is preferably 0.02, and more preferably 0.03.

In addition, in order to obtain the above effect, the upper limit value of Conditional Expression (6) is preferably 30, more preferably 25, and still more preferably 23. The lower limit value of Conditional Expression (6) is preferably 15, and more preferably 18.

1-3-6. Conditional Expression (7)

$$0.3 \leq BFw/Y \leq 1.5 \quad (7)$$

where

BFw is a back focus of the zoom lens at a wide-angle end, and is a value obtained by converting a cover glass thickness to an air conversion length, and Y is a maximum image height of zoom lens.

Conditional Expression (7) is a conditional expression for defining the ratio between the back focus of the zoom lens and the maximum image height of the zoom lens at the wide-angle end. When Conditional Expression (7) is satisfied, the back focus of the zoom lens at the wide-angle end can be shortened, and the entire length can be reduced.

When the numerical value of Conditional Expression (7) is less than the lower limit value, the back focus of the zoom lens at the wide-angle end is too short, and the inclination angle of the incident light on the imaging plane with respect to the optical axis is too large. On the other hand, when the numerical value of Conditional Expression (7) exceeds the upper limit value, the back focus of the zoom lens at the wide-angle end is too long, so that it is difficult to reduce the overall length of the zoom lens.

In order Co obtain the above effect, the upper limit value of Conditional Expression (7) is preferably 1.3, more preferably 1.2, and still more preferably 1.1. The lower limit value of Conditional Expression (7) is preferably 0.4, more preferably 0.5, and still more preferably 0.6.

2. Imaging Apparatus

Next, the imaging apparatus according to the present invention will be described. The imaging apparatus according to the present invention includes a zoom lens according to the present invention and an image sensor that converts an optical image formed by the zoom lens into an electrical signal. Note that the image sensor is preferably provided on the image side of the zoom lens. As the image sensor, a charge coupled device (CCD) sensor, a complementary metal oxide semiconductor (CMOS) sensor, or the like can be suitably used.

Specifically, according to the zoom lens, the overall size is small and the optical performance is excellent while the aperture ratio is large. In addition, the zoom lens can suppress a variation in an angle of view due to movement of a focus group, and is suitable for capturing a moving image using a tracking AF function and the like not only in a case of adopting a contrast AF method but also in a case of adopting an image plane phase difference AF method. Therefore, by adopting the zoom lens, it is possible to obtain an imaging apparatus suitable for capturing a moving image having a tracking AF function.

Next, the present invention will be specifically described with reference to examples. However, the present invention is not limited to the following examples.

EXAMPLE 1

(1) Optical Configuration

FIG. 1 is a cross-sectional view of a zoom lens according to Example 1 of the present invention at a wide-angle end in an in-focus state on infinity. The zoom lens according to Example 1 includes, in order from the object side, a first lens group G1 having positive refractive power, a second lens group G2 having negative refractive power, a third lens group G3 having positive refractive power, a fourth lens group G4 having negative refractive power, and a fifth lens group G5 having negative refractive power. The third lens group G3 corresponds to the intermediate group M. The fourth lens group G4 corresponds to the lens group F. The fifth lens group G5 corresponds to the rear group R.

In zooming from the wide-angle end to the telephoto end, the first lens group G1 moves toward the object, the second lens group G2 moves toward the image, the third lens group G3 moves toward the object, the fourth lens group G4 moves toward the object, and the fifth lens group G5 moves toward the object.

Focusing from an infinite-distance object to a short-distance object is performed by the fourth lens group G4 (lens group F) moving toward the image.

An aperture stop S is disposed adjacent to the third lens group G3 and closer to the object than the third lens group G3.

Hereinafter, the configuration of each lens group will be described.

The first lens group G1 includes, in order from the object side, a cemented lens in which a negative meniscus lens L1 and a biconvex lens L2 each having a convex surface facing an object are cemented, and a positive meniscus lens L3 having a convex surface facing an object.

The second lens group G2 includes, in order from the object side, a negative meniscus lens L4 with a convex surface facing an object, a biconvex lens L5, a biconcave lens L6, a cemented lens in which a biconcave lens L7 and a biconvex lens L8 are cemented, and a negative meniscus lens L9 with a concave surface facing an object.

The third lens group G3 includes, in order from the object side, a positive meniscus lens L10 with a convex surface facing an object, a positive meniscus lens L11 with a convex surface facing an object, a cemented lens in which three lenses of negative meniscus lens L12 with a convex surface facing an object, a biconvex lens L13, and a biconcave lens L14 are cemented, a negative meniscus lens L15 with a concave surface facing an object, and a biconvex lens L16. The negative meniscus lens L15 is a glass molded aspherical lens having a surface, facing an object, in an aspherical shape. The biconvex lens L16 is a glass molded aspherical lens having both surfaces in an aspherical shape. The cemented surface between the negative meniscus lens L12 and the biconvex lens L13 and the cemented surface between the biconvex lens L13 and the biconcave lens L14 are diverging surfaces, and each of these cemented surfaces is the lens surface Si (S1, S2) according to the present invention. In addition, an air lens having a biconvex shape is formed between the biconcave lens L14 and the negative meniscus lens L15, and has negative refractive power. The lens surface, closest to the object, of the third lens group is convex toward the object, and the lens surface closest to the image is convex toward the image.

The fourth lens group G4 includes a cemented lens in which a biconvex lens L17 and a biconcave lens L18 are cemented.

The fifth lens group G5 includes, in order from the object side, a cemented lens in which a negative meniscus lens L19 having a convex surface facing an object and a biconvex lens L20 are cemented, and a negative meniscus lens L21 having a concave surface facing an object. The negative meniscus lens L21 is a glass molded aspherical lens having both surfaces in an aspherical shape.

Note that, in FIG. 1, "IP" represents an image plane, and specifically represents an imaging plane of an image sensor such as a CCD sensor or a CMOS sensor, a film face of a silver salt film, or the like. In addition, a parallel flat plate having no substantial refractive power such as a cover glass CC is provided on a face, of the g image plane IP, facing the object. These points are similar in each lens cross-sectional view shown in other examples, and thus the description thereof will be omitted below.

(2) Numerical Examples

Next, numerical examples to which specific numerical values of the zoom lens are applied will be described. Hereinafter, "lens data", "specification table", "variable space", "lens group data", and "aspherical coefficient" are illustrated. The values of Conditional Expressions (1) to (7) (Table 1), the values used to obtain Conditional Expressions, and the value of φLCn of each Example (Table 2) are collectively shown after Example 6.

In the "lens data", "surface number" indicates the order of the lens surface counted from the object side, "r" indicates a radius of curvature of the lens surface, "d" indicates a lens thickness or the air space on the optical axis, "nd" indicates a refractive index with respect to d Line (wavelength λ=587.56 nm), and "vd" indicates an Abbe number with respect to d Line. In addition, in the field of "surface number", "ASPH" attached after the surface number indicates that the lens surface is an aspherical surface, and "S" indicates that the surface is an aperture stop. In the field of "d", "d(0)", "d(5)", and the like mean that the space between the lens surfaces on the optical axis is a variable space that changes at the time of variable magnification change. "∞" in the field of the radius of curvature means infinity, and means that the lens surface is a flat face. All the units of the length in the table are "mm", and all the units of the angle of view are "°", and the same applies to the other tables.

In the "specification table", "f" indicates a focal length of the zoom lens, "FNo." indicates an F value, "ω" indicates a half angle of view, and "Y" indicates an image height. Values at a wide-angle end, an intermediate focal length, and a telephoto end are illustrated.

The "variable space" indicates values at the wide-angle end, the intermediate focal length, and the telephoto end in an in-focus state on infinity and in an in-focus state on a short-distance object.

[Lens group data] indicates the focal length of each lens group.

The "aspherical coefficient" indicates an aspherical coefficient when an aspherical shape is defined as follows. x is an amount of displacement from the reference surface in the optical axis direction, r is a paraxial radius of curvature, H is a height from the optical axis in a direction perpendicular to the optical axis, k is a conic coefficient, and An is an n-th order aspherical coefficient. In the table of "aspherical coefficient", "E±XX" represents an exponential notation and means "×10$^{\pm xx}$".

$$x = \frac{H^2/r}{1+\sqrt{1-(1+k)(H/r)^2}} + \quad \text{[Math 1]}$$

$$A_4H^4 + A_6H^6 + A_8H^8 + A_{10}H^{10} + A_{12}H^{12}$$

Since the matters in each of these tables are the same in each of the tables shown in other Examples, the description thereof will be omitted below.

Figure 2:
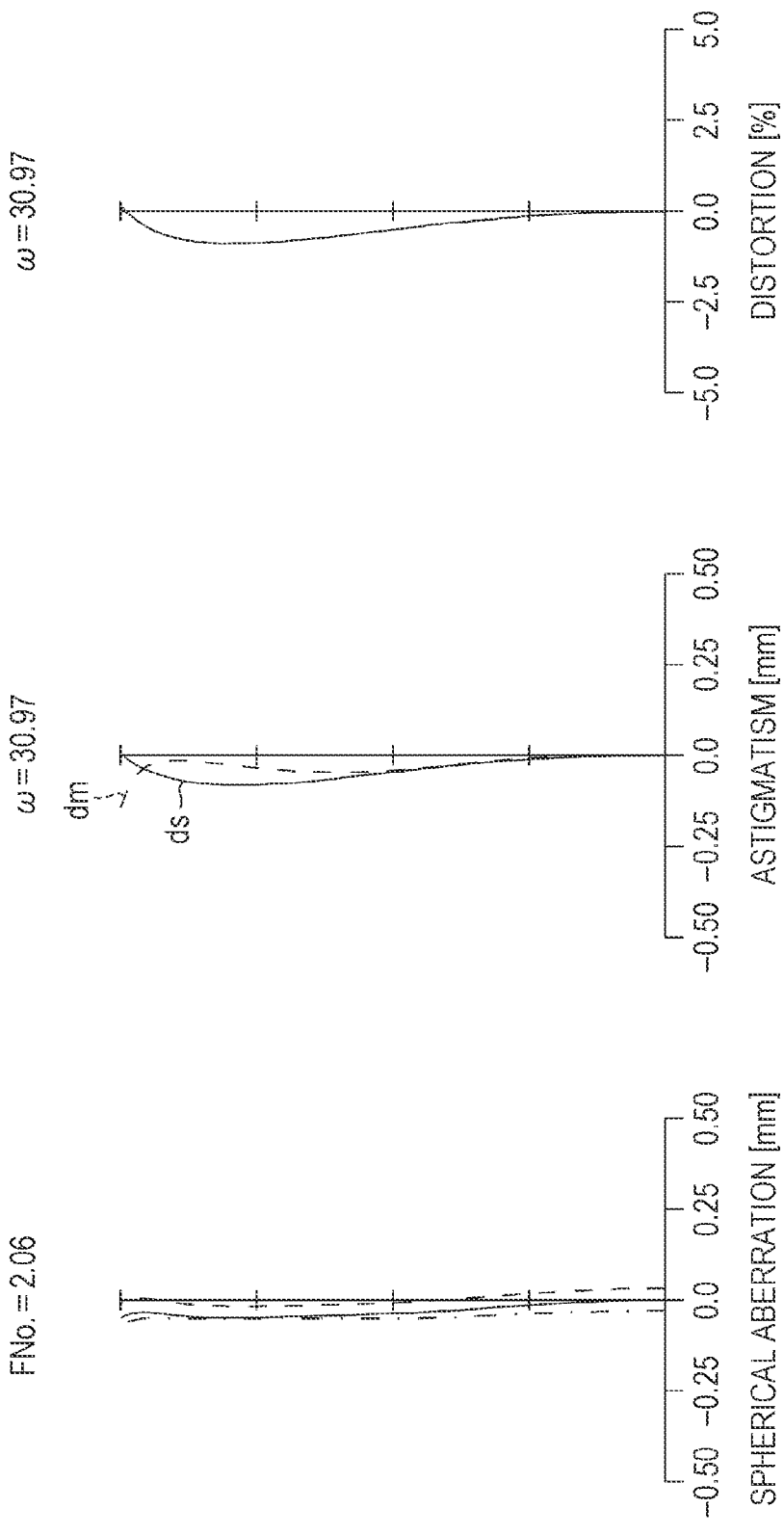
FIG. 2 is a spherical aberration diagram, an astigmatism diagram, and a distortion diagram at the wide-angle end of the zoom lens according to Example 1 an in-focus state on infinity.
Figure 3:
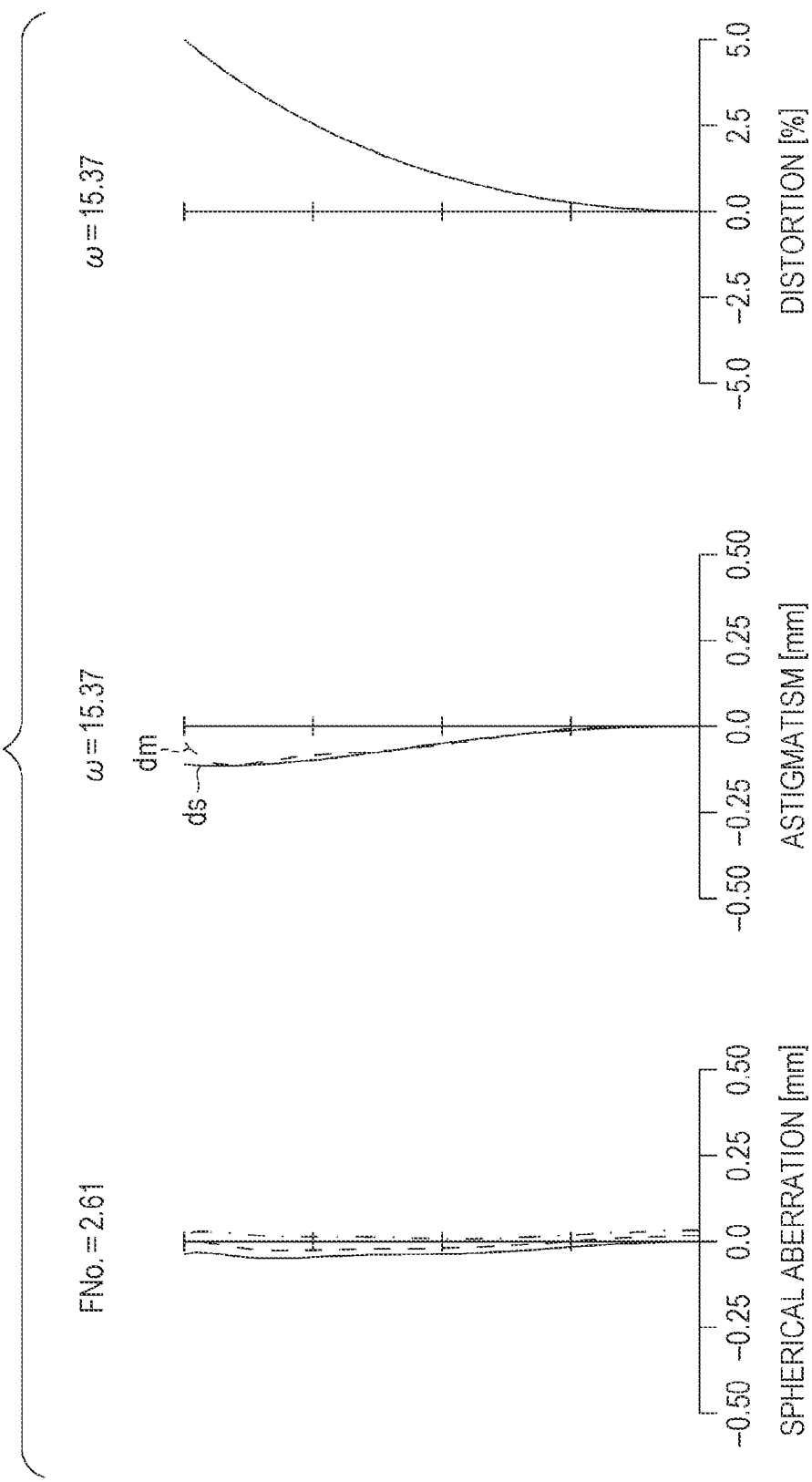
FIG. 3 is a spherical aberration diagram, an astigmatism diagram, and a distortion diagram at an intermediate focal length of the zoom lens according to Example 1 in an in-focus state on infinity.
Figure 4:
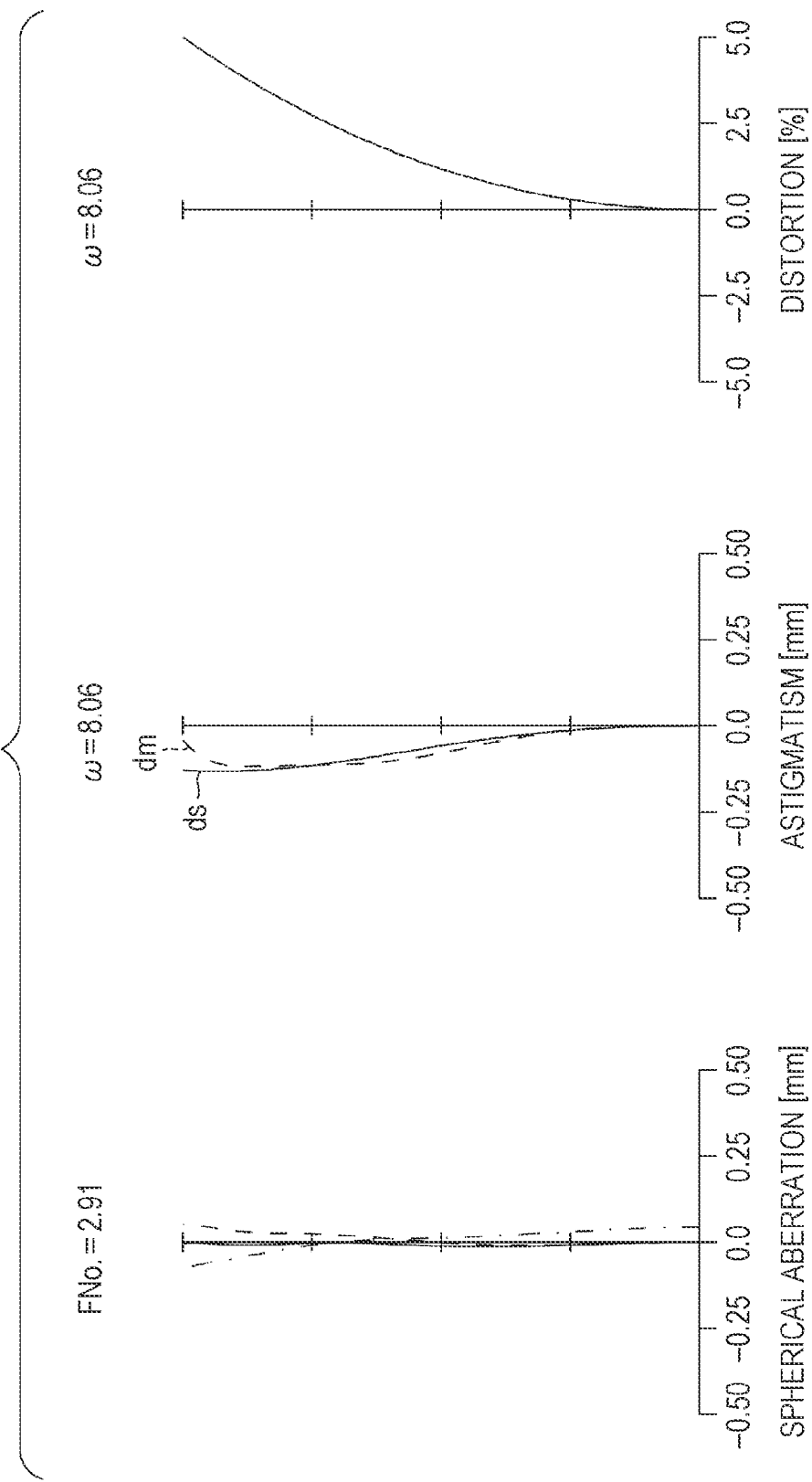
FIG. 4 is a spherical aberration diagram, an astigmatism diagram, and a distortion diagram at the telephoto end of the zoom lens according to Example 1 in an in-focus state on infinity.

FIGS. 2, 3, and 4 illustrate longitudinal aberration diagrams of the zoom lens at the wide-angle end, the intermediate focal length, and the telephoto end in an in-focus state on infinity. The longitudinal aberration diagram illustrated in each drawing is a spherical aberration (mm), an astigmatism (mm), and a distortion (%) in order from the left side. In the spherical aberration diagram, the solid line indicates a spherical aberration with respect to d Line (wavelength: 587.56 nm), the broken line indicates a spherical aberration with respect to the C-line (wavelength: 656.28 nm), and the dash-dot line indicates a spherical aberration with respect to g Line (wavelength: 435.84 nm). In the astigmatism diagram, the vertical axis represents a half angle of view (ω), the horizontal axis represents a defocus, the solid Line indicates a sagittal image plane (ds) of d Line, and the broken line indicates a meridional image plane (dm) of d Line. In the distortion diagram, the vertical axis represents a half angle of view (ω), and the horizontal axis represents a distortion. These matters are the same in the aberration diagrams illustrated in other Examples, and thus the description thereof will be omitted below.

| [Lens Data] | | | | |
|---|---|---|---|---|
| Surface number | r | d | nd | vd |
| Object surface | ∞ | d(0) | | |
| 1 | 192.4282 | 1.5000 | 1.91082 | 35.25 |
| 2 | 100.0065 | 10.0532 | 1.49700 | 81.61 |
| 3 | −252.2417 | 0.2000 | | |
| 4 | 71.5654 | 6.5650 | 1.49700 | 81.61 |
| 5 | 192.2789 | d(5) | | |
| 6 | 83.7631 | 1.5000 | 1.87070 | 40.73 |
| 7 | 28.8102 | 8.6177 | | |
| 8 | 520.2462 | 4.1099 | 1.80518 | 25.46 |
| 9 | −79.0552 | 0.4606 | | |
| 10 | −180.0295 | 1.2000 | 1.87070 | 40.73 |
| 11 | 128.0584 | 4.0554 | | |
| 12 | −37.2450 | 1.2000 | 1.59282 | 68.62 |
| 13 | 46.6295 | 5.0613 | 1.91082 | 35.25 |
| 14 | −120.2559 | 1.9148 | | |
| 15 | −42.1599 | 1.2000 | 1.72916 | 54.67 |
| 16 | −83.9970 | d(16) | | |
| 17S | ∞ | 1.2000 | | |
| 18 | 38.6389 | 5.2507 | 1.92286 | 20.88 |
| 19 | 120.0000 | 0.1500 | | |
| 20 | 35.4374 | 5.0901 | 1.59282 | 68.62 |
| 21 | 97.2289 | 0.4000 | | |
| 22 | 96.5811 | 1.3000 | 1.84666 | 23.78 |
| 23 | 19.5924 | 13.1150 | 1.61800 | 63.39 |
| 24 | −28.9537 | 1.3000 | 1.90366 | 31.31 |
| 25 | 150.9663 | 2.2521 | | |
| 26ASPH | −112.3666 | 1.5000 | 1.80625 | 40.91 |
| 27 | −14100.5277 | 0.2067 | | |
| 28ASPH | 40.3440 | 7.2282 | 1.77377 | 47.17 |
| 29ASPH | −38.9138 | d(29) | | |
| 30 | 105.0374 | 3.0753 | 1.92286 | 20.88 |
| 31 | −93.2811 | 0.9000 | 1.80100 | 34.97 |

-continued

[Lens Data]

| Surface number | r | d | nd | vd |
|---|---|---|---|---|
| 32 | 27.9385 | d(32) | | |
| 33 | 55.5333 | 1.2000 | 1.91082 | 35.25 |
| 34 | 18.9288 | 9.5794 | 1.59270 | 35.31 |
| 35 | −48.7564 | 6.1999 | | |
| 36ASPH | −23.1657 | 1.8000 | 1.69350 | 53.18 |
| 37ASPH | −77.5216 | d(37) | | |
| 38 | ∞ | 2.5000 | 1.51680 | 64.20 |
| 39 | ∞ | 1.0000 | | |
| Image plane | ∞ | | | |

[Specification Table]

| | Wide-angle end | Intermediate | Telephoto end |
|---|---|---|---|
| f | 36.0267 | 74.9717 | 145.5296 |
| FNo. | 2.0604 | 2.6090 | 2.9089 |
| ω | 30.9716 | 15.3720 | 8.0578 |
| Y | 21.6330 | 21.6330 | 21.6330 |

[Variable space]

| | Wide-angle end | Intermediate | Telephoto end | Wide-angle end | Intermediate | Telephoto end |
|---|---|---|---|---|---|---|
| d(0) | ∞ | ∞ | ∞ | 626.8162 | 611.5614 | 586.0399 |
| d(5) | 1.0000 | 29.0327 | 59.7393 | 1.0000 | 29.0327 | 59.7393 |
| d(16) | 34.1032 | 11.6612 | 1.3000 | 34.1032 | 11.6612 | 1.3000 |
| d(29) | 2.2957 | 5.3936 | 3.4962 | 3.1957 | 8.3197 | 11.9612 |
| d(32) | 9.3997 | 9.8819 | 13.0383 | 8.4997 | 6.9558 | 4.5732 |
| d(37) | 13.5000 | 19.5839 | 23.5011 | 13.5000 | 19.5839 | 23.5011 |

[Lens group data]

| Group No. | Focal length |
|---|---|
| G1 | 142.9320 |
| G2 | −30.6227 |
| G3 | 32.3890 |
| G4 | −55.4052 |
| G5 | −136.9750 |

[Aspherical Coefficient]

| Surface number | k | A4 | A6 | A8 | A10 | A12 |
|---|---|---|---|---|---|---|
| 26 | −4.7618 | −1.12558E−05 | −5.41558E−09 | 2.44928E−11 | 6.66569E−15 | −8.00140E−17 |
| 28 | −2.2576 | −4.43682E−06 | −2.17277E−09 | −1.47235E−11 | 7.75635E−14 | −1.53877E−16 |
| 29 | 0.0000 | −1.98686E−06 | 3.48149E−09 | −1.33604E−11 | 6.20532E−14 | −1.57248E−16 |
| 36 | −0.5742 | 3.82990E−06 | 1.75904E−08 | −4.02738E−10 | 1.60174E−12 | −2.66841E−15 |
| 37 | 0.0000 | −6.60728E−06 | −1.46925E−09 | −2.17773E−10 | 7.57891E−13 | −1.17814E−15 |

EXAMPLE 2

(1) Optical Configuration

Figure 5:
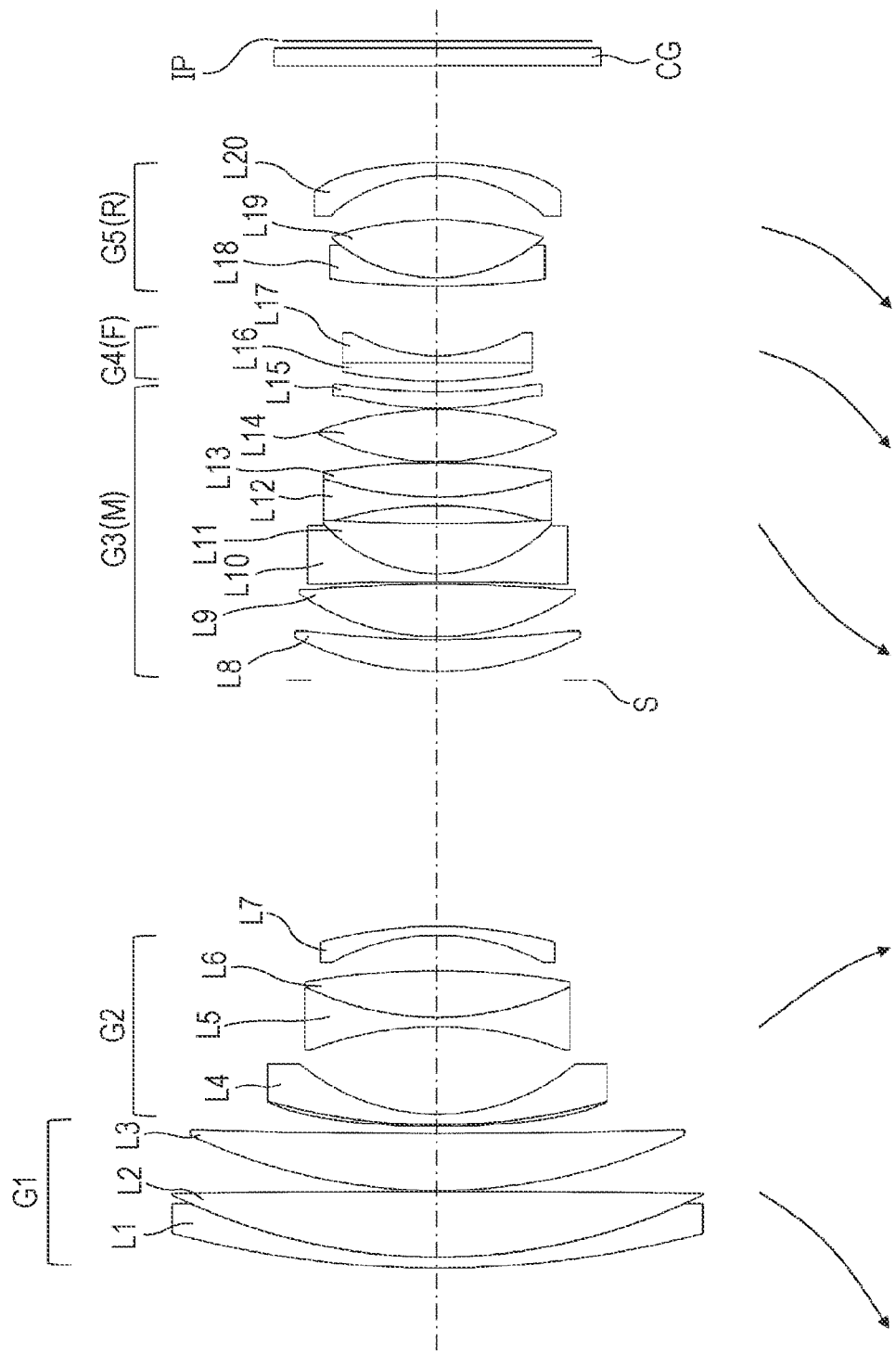
FIG. 5 is a lens cross-sectional view at a wide-angle end of a zoom lens according to Example 2.

FIG. 5 is a cross-sectional view of a zoom lens according to Example 2 of the present invention at a wide-angle end in an in-focus state on infinity. The zoom lens according to Example 2 includes, in order from the object side, a first lens group G1 having positive refractive power, a second lens group G2 having negative refractive power, a third lens group G3 having positive refractive power, a fourth lens group G4 having negative refractive power, and a fifth lens group G5 having negative refractive power. The third lens group G3 corresponds to the intermediate group M. The fourth lens group G4 corresponds to the lens group F. The fifth lens group G5 corresponds to the rear group R.

In zooming from the wide-angle end to the telephoto end, the first lens group G1 moves toward the object, the second lens group G2 moves toward the image, the third lens group G3 moves toward the object, the fourth lens group G4 moves toward the object, and the fifth lens group G5 moves toward the object.

Focusing from an infinite-distance object to a short-distance object is performed by the fourth lens group G4 (lens group F) moving toward the image.

An aperture stop s is disposed adjacent to the third lens group G3 and closer to the object than the third lens group G3.

Hereinafter, the configuration of each lens group will be described.

The first lens group G1 includes, in order from the object side, a cemented lens in which a negative meniscus lens L1 and a biconvex lens L2 each having a convex surface facing an object are cemented, and a positive meniscus lens L3 having a convex surface facing an object.

The second lens group G2 includes, in order from the object side, the negative meniscus lens L4 having a convex surface facing an object, a cemented lens in which the biconcave lens 15 and the biconvex lens L6 are cemented, and a negative meniscus lens L7 having a concave surface facing an object. The negative meniscus lens L4 a composite resin molded aspherical lens on which a composite resin film molded in an aspherical shape facing an object is attached.

The third lens group G3 includes, in order from the object side, a positive meniscus lens L8 with a convex surface facing an object, a biconvex lens L9, a cemented lens in which a biconcave lens L10 and the positive meniscus lens L11 with a convex surface facing an object are cemented, a cemented lens in which a biconcave lens L12 and the biconvex lens L13 are cemented, a biconvex lens L14, and a positive meniscus lens L15 with a convex surface facing an object. The biconvex lens L9 is a glass molded aspherical lens having both surfaces in an aspherical shape. The biconvex lens L14 is a glass molded aspherical lens having both surfaces in an aspherical shape. The cemented surface between the biconcave lens L10 and the positive meniscus lens L11 and the cemented surface between the biconcave lens L12 and the biconvex lens L13 are diverging surfaces, and these cemented surfaces are the lens surfaces Si (S1, S2) according to the present invention. In addition, an air lens having a biconvex shape is formed between the positive meniscus lens L11 and the biconcave lens L12, and has negative refractive power. The lens surface, closest to the object, of the third lens group is convex toward the object.

A fourth lens group G4 includes a cemented lens in which the biconvex lens L16 and a biconcave lens L17 are cemented.

The fifth lens group G5 includes, in order from the object side, a cemented lens in which a negative meniscus lens L18 having a convex surface facing an object and a biconvex lens L19 are cemented, and a negative meniscus lens L20 having a concave surface facing an object. The negative meniscus lens L20 is a glass molded aspherical lens having both surfaces in an aspherical shape.

(2) Numerical Examples

Figure 6:
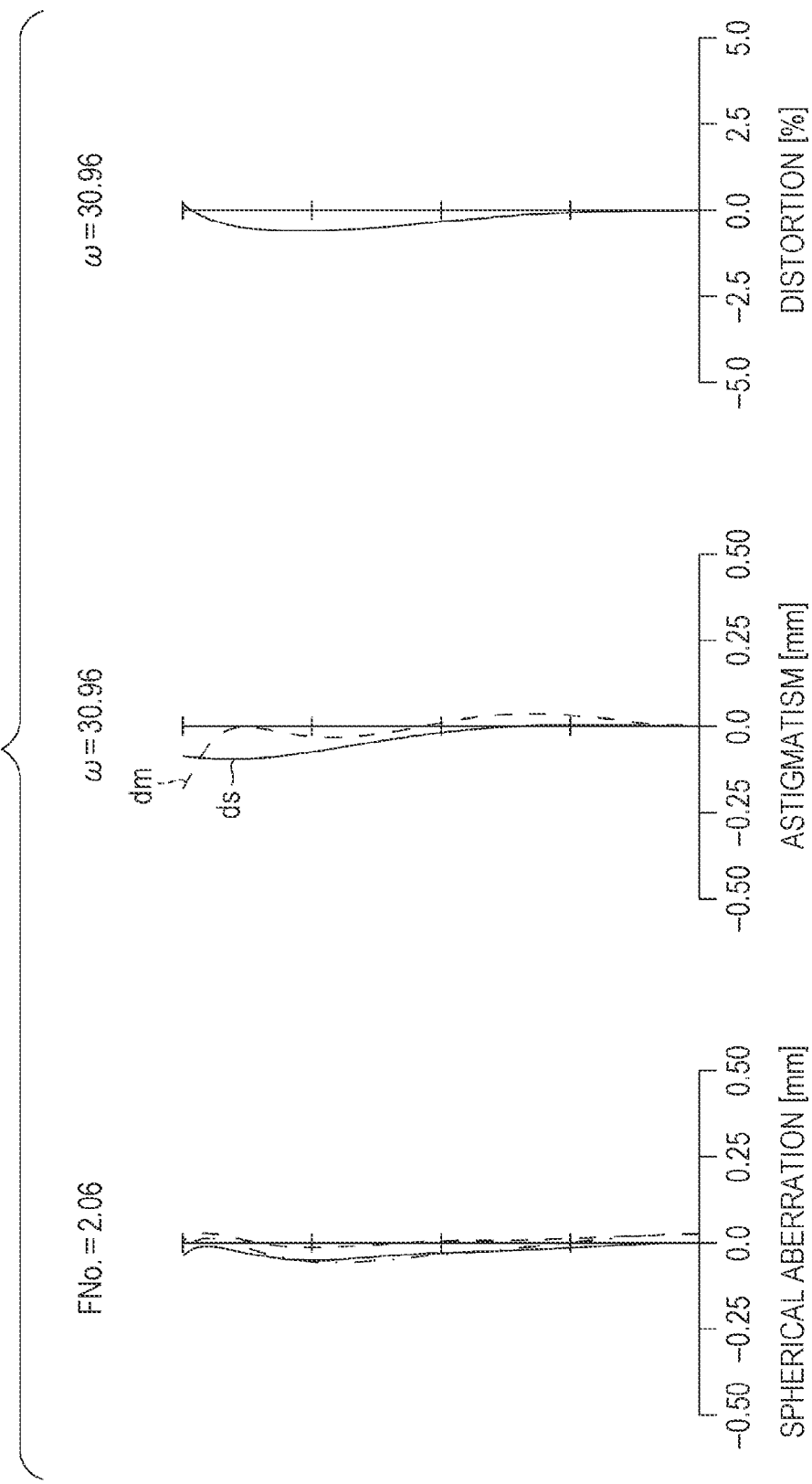
FIG. 6 is a spherical aberration diagram, an astigmatism diagram, and a distortion diagram at the wide-angle end of the zoom lens according to Example 2 in an in-focus state on infinity.
Figure 7:
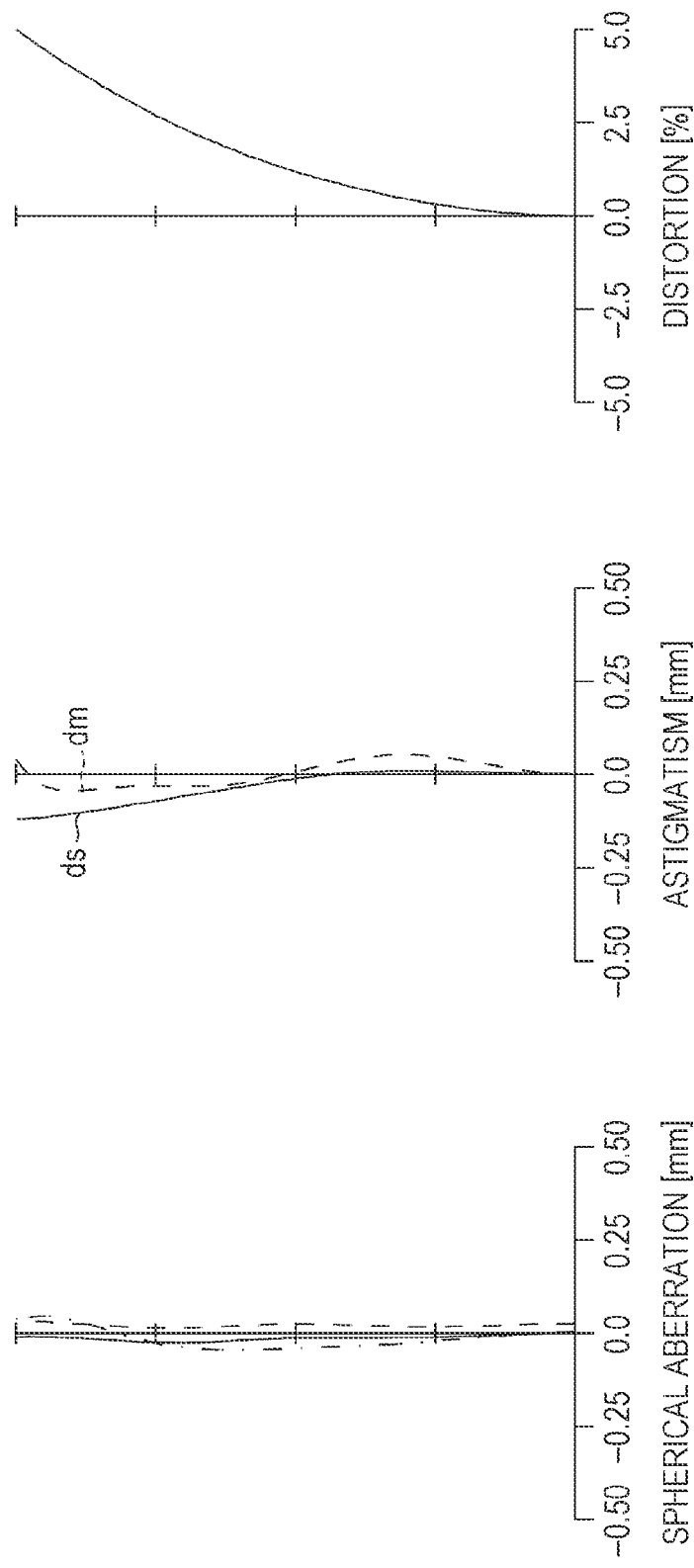
FIG. 7 is a spherical aberration diagram, an astigmatism diagram, and a distortion diagram at an intermediate focal length of the zoom lens according to Example 2 in an in-focus state on infinity.
Figure 8:
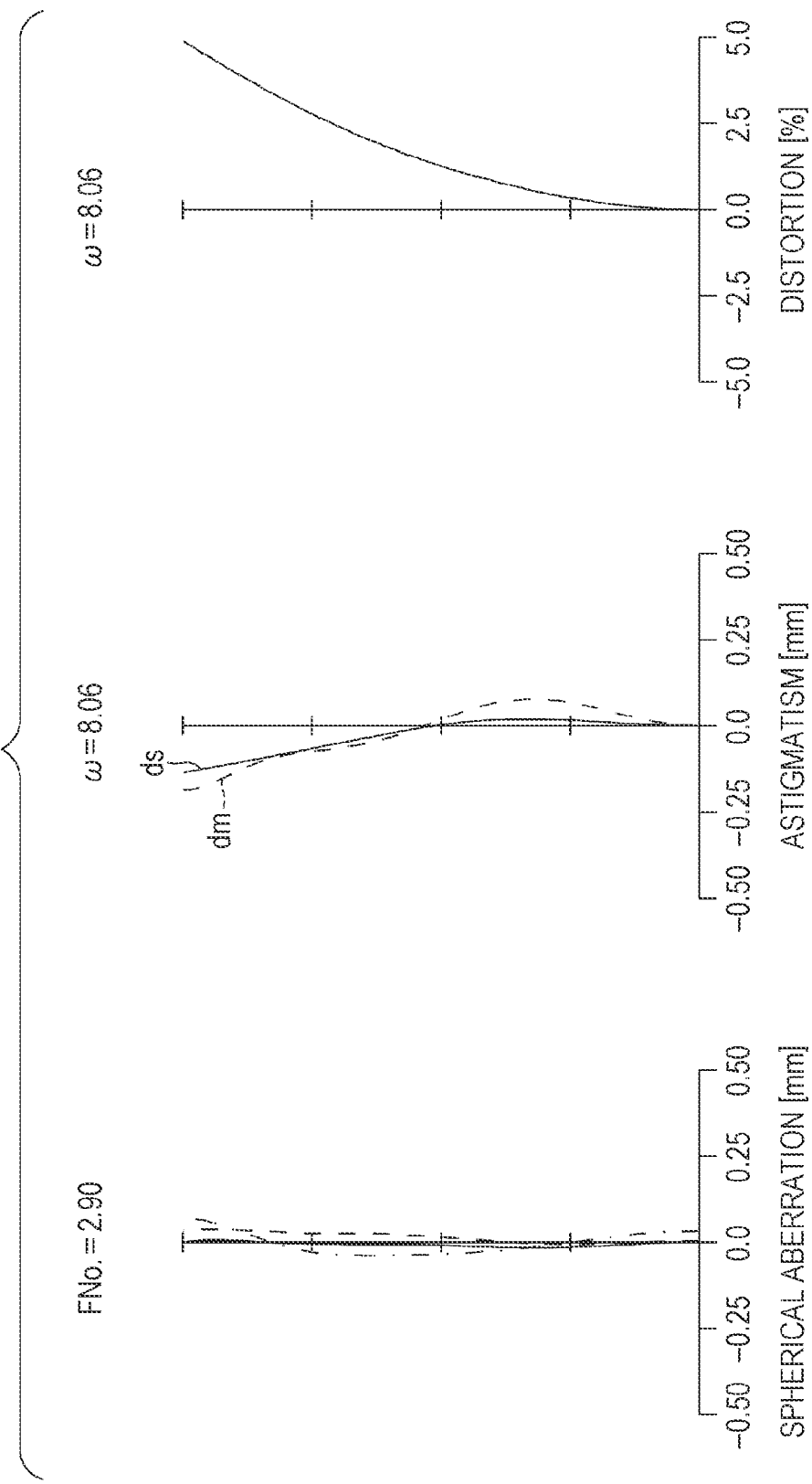
FIG. 8 is a spherical aberration diagram, an astigmatism diagram, and a distortion diagram at the telephoto end of the zoom lens of Example 2 in an in-focus state on infinity.

Next, numerical examples to which specific numerical values of the zoom lens are applied will be described. Hereinafter, "lens data", "specification table", "variable space", "lens group data", and "aspherical coefficient" are illustrated. FIGS. 6 to 8 illustrate longitudinal aberration diagrams of the zoom lens at the wide-angle end, the intermediate focal length, and the telephoto end in an in-focus state on infinity.

[Lens Data]

| Surface number | r | d | nd | vd |
|---|---|---|---|---|
| Object surface | ∞ | d(0) | | |
| 1 | 145.9494 | 1.5000 | 1.91082 | 35.25 |
| 2 | 83.3622 | 9.0822 | 1.49700 | 81.61 |
| 3 | −2840.7860 | 0.2000 | | |
| 4 | 81.0894 | 7.9479 | 1.49700 | 81.61 |
| 5 | 1168.1206 | d(5) | | |
| 6ASPH | 135.2890 | 0.1800 | 1.51460 | 49.96 |
| 7 | 86.2642 | 1.5000 | 1.83481 | 42.72 |

-continued

[Lens Data]

| Surface number | r | d | nd | vd |
|---|---|---|---|---|
| 8 | 29.7292 | 12.2200 | | |
| 9 | −48.9515 | 1.3000 | 1.55032 | 75.50 |
| 10 | 42.1316 | 6.5000 | 1.85025 | 30.05 |
| 11 | −110.1752 | 4.9204 | | |
| 12 | −30.5776 | 1.2000 | 1.75500 | 52.32 |
| 13 | −63.4894 | d(13) | | |
| 14S | ∞ | 1.2000 | | |
| 15 | 43.5524 | 4.5077 | 1.92286 | 20.88 |
| 16 | 144.9998 | 0.3619 | | |
| 17ASPH | 33.9965 | 7.4165 | 1.69350 | 53.18 |
| 18ASPH | −124.7641 | 0.2000 | | |
| 19 | −700.0000 | 1.2000 | 1.84666 | 23.78 |
| 20 | 21.7021 | 6.9802 | 1.49700 | 81.61 |
| 21 | 303.0657 | 2.4810 | | |
| 22 | −50.7442 | 1.2000 | 1.90366 | 31.31 |
| 23 | 49.9653 | 4.7458 | 1.49700 | 81.61 |
| 24 | −107.3634 | 0.2000 | | |
| 25 | 37.9205 | 7.2355 | 1.63930 | 44.87 |
| 26 | −48.1484 | 0.2000 | | |
| 27ASPH | 48.6112 | 2.2908 | 1.85135 | 40.10 |
| 28ASPH | 109.5210 | d(28) | | |
| 29 | 67.5033 | 2.6442 | 1.92286 | 20.88 |
| 30 | −1897.7939 | 0.9000 | 1.83481 | 42.72 |
| 31 | 23.7581 | d(31) | | |
| 32 | 111.0428 | 1.2000 | 1.90366 | 31.31 |
| 33 | 22.3542 | 8.0792 | 1.63980 | 34.47 |
| 34 | −47.3375 | 6.1126 | | |
| 35ASPH | −22.3258 | 1.8000 | 1.69350 | 53.18 |
| 36ASPH | −59.5481 | d(36) | | |
| 37 | ∞ | 2.5000 | 1.51680 | 64.20 |
| 38 | ∞ | 1.0000 | | |
| Image plane | ∞ | | | |

[Specification Table]

| | Wide-angle end | Intermediate | Telephoto end |
|---|---|---|---|
| f | 36.0230 | 74.9830 | 145.6157 |
| FNo. | 2.0602 | 2.5529 | 2.9033 |
| ω | 30.9602 | 15.3672 | 8.0607 |
| Y | 21.6330 | 21.6330 | 21.6330 |

[Variable space]

| | Wide-angle end | Intermediate | Telephoto end | Wide-angle end | Intermediate | Telephoto end |
|---|---|---|---|---|---|---|
| d(0) | ∞ | ∞ | ∞ | 628.9852 | 618.3808 | 589.9625 |
| d(5) | 1.0000 | 27.1468 | 58.8735 | 1.0000 | 27.1468 | 58.8735 |
| d(13) | 34.3410 | 9.5673 | 1.3000 | 34.3410 | 9.5673 | 1.3000 |
| d(28) | 1.4985 | 4.9803 | 2.2040 | 2.2671 | 7.5532 | 9.1951 |
| d(31) | 9.6695 | 10.5918 | 13.2870 | 8.9009 | 8.0189 | 6.2959 |
| d(36) | 13.5000 | 18.3273 | 23.3673 | 13.5000 | 18.3273 | 23.3673 |

[Lens group data]

| Group No. | Focal length |
|---|---|
| G1 | 140.4610 |
| G2 | −30.5472 |
| G3 | 31.5372 |
| G4 | −48.7235 |
| G5 | −122.8010 |

[Aspherical Coefficient]

| Surface number | k | A4 | A6 | A8 | A10 | A12 |
|---|---|---|---|---|---|---|
| 6 | 0.0000 | 2.89963E−06 | −5.51989E−10 | 7.77888E−12 | −1.63823E−14 | 2.04260E−17 |
| 17 | −0.1449 | 5.07906E−07 | 7.70271E−10 | −1.64591E−14 | −2.42516E−15 | −1.78380E−18 |
| 18 | 0.0000 | 6.18574E−06 | −5.88755E−09 | −6.00957E−13 | 1.47022E−14 | −1.55981E−17 |
| 27 | 2.1900 | −5.30197E−07 | −2.91735E−08 | 2.10024E−10 | −1.92044E−12 | 2.73199E−15 |
| 28 | 0.0000 | 1.12776E−05 | −2.44800E−08 | 2.80217E−10 | −2.44970E−12 | 4.02006E−15 |
| 35 | −0.3058 | −9.39037E−07 | 9.78413E−08 | −8.59775E−10 | 2.96318E−12 | −5.69564E−15 |
| 36 | 0.0000 | −1.07823E−05 | 4.00794E−08 | −3.65098E−10 | 8.64536E−13 | −1.17458E−15 |

EXAMPLE 3

(1) Optical Configuration

Figure 9:
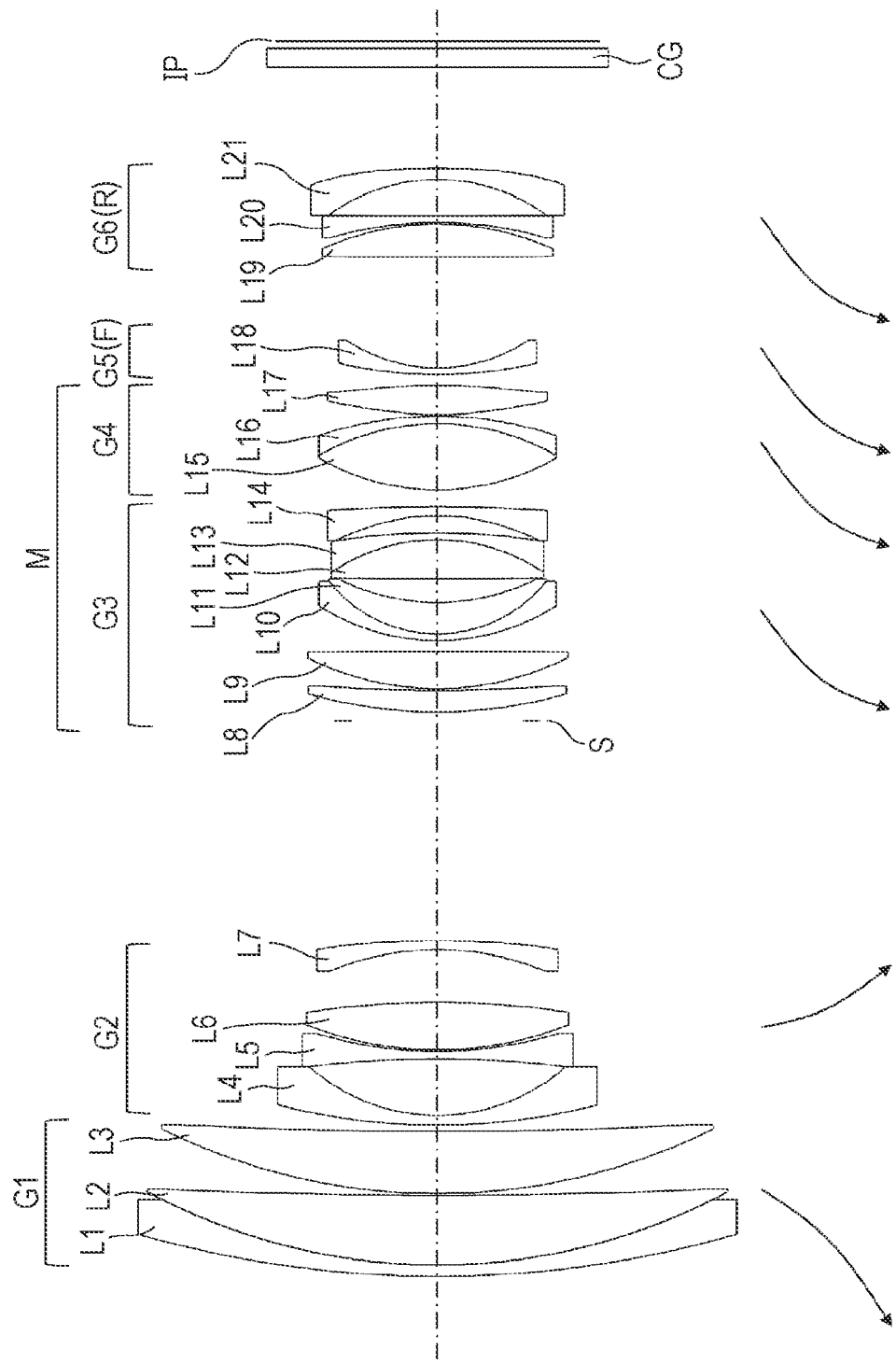
FIG. 9 is a lens cross-sectional view of a zoom lens at a wide-angle end according to Example 3.

FIG. 9 is a cross-sectional view of a zoom lens according to Example 3 of the present invention at a wide-angle end in an in-focus state on infinity; The zoom lens according to Example 3 includes, in order from the object side, a first lens group G1 having positive refractive power, a second lens group G2 having negative refractive power, a third lens group G3 having positive refractive power, the fourth lens group G4 having positive refractive power, the fifth lens group G5 having negative refractive power, and a sixth lens group G6 having negative refractive power. Intermediate group M includes the third lens group G3 and the fourth lens group G4. The fifth lens group G5 corresponds to the lens group F. The sixth lens group G6 corresponds to the rear group R.

In zooming from the wide-angle end to the telephoto end, the first lens group G1 moves toward the object, the second lens group G2 moves toward the image, the third lens group G3 moves toward the object, the fourth lens group G4 moves toward the object, the fifth lens group G5 moves toward the object, and the sixth lens group G6 moves toward the object.

Focusing from an infinite-distance object to a short-distance object is performed by the fifth lens group G5 (lens group F) moving toward the image.

An aperture stop S is disposed adjacent to the third lens group G3 and closer to the object than the third lens Group G3.

Hereinafter, the configuration of each lens group will be described.

The first lens group G1 includes, in order from the object side, a cemented lens in which the negative meniscus lens L1 having a convex surface facing an object and a positive meniscus lens L2 having a convex surface facing an object are cemented, and the positive meniscus lens L3 having a convex surface facing an object.

The second lens group G2 includes, in order from the object side, the negative meniscus lens L4 having a convex surface facing an object, a biconcave lens L5, a biconvex lens L6, and the negative meniscus lens L7 having a concave surface facing an object. The negative meniscus lens L7 is a glass molded aspherical lens having a surface, facing the image, in an aspherical shape.

The third lens group G3 includes, in order from the object side, the positive meniscus lens L8 with a convex surface facing an object, the biconvex lens L9, a cemented lens in which a negative meniscus lens L10 with a convex surface facing an object and positive meniscus lens 1:11 with a convex surface facing an object are cemented, a cemented lens in which a biconvex lens L12 and a negative meniscus lens L13 with a concave surface facing an object are cemented, and a negative meniscus lens L14 with a concave surface facing an object. The negative meniscus lens L14 is a glass molded aspherical Lens having both surfaces in an aspherical shape. The cemented surface between the negative meniscus lens L10 and the positive meniscus lens L11 and the cemented surface between the biconvex lens L12 and the negative meniscus lens L13 are diverging surfaces, and these cemented surfaces are the lens surfaces Si (S1, S2) in the present invention. An air lens having a positive meniscus shape with a convex surface facing an object is formed between the positive meniscus lens L11 and the biconvex lens L12. Similarly, an air lens having a positive meniscus shape with a concave surface facing an object is formed between the negative meniscus lens L13 and the negative meniscus lens L14. All of these air lenses have negative refractive power. The lens surface, closest to the object, of the third lens group (intermediate group M) is convex toward the object.

The fourth lens group G4 includes, in order from the object side, a cemented lens in which a biconvex lens L15 and a negative meniscus lens L16 having a concave surface facing an object are cemented, and the biconvex lens L17. The biconvex lens L17 is a glass molded aspherical lens having both surfaces in an aspherical shape. The cemented surface between the biconvex lens L15 and the negative meniscus lens L16 is a diverging surface, and the cemented surface is also a lens surface Si (S3) according to the present invention. The lens surface, closest to the image, of the fourth lens group (intermediate group M) is convex toward the image.

The fifth lens Group G5 includes the negative meniscus lens L18 having a convex surface facing an object.

The sixth lens group G6 includes, in order from the object side, the biconvex lens L19, the negative meniscus lens L20 having a concave surface facing an object, and the negative meniscus lens L21 having a concave surface facing an object. The negative meniscus lens L21 is a glass molded aspherical lens having both surfaces in an aspherical shape.

(2) Numerical Examples

Figure 10:
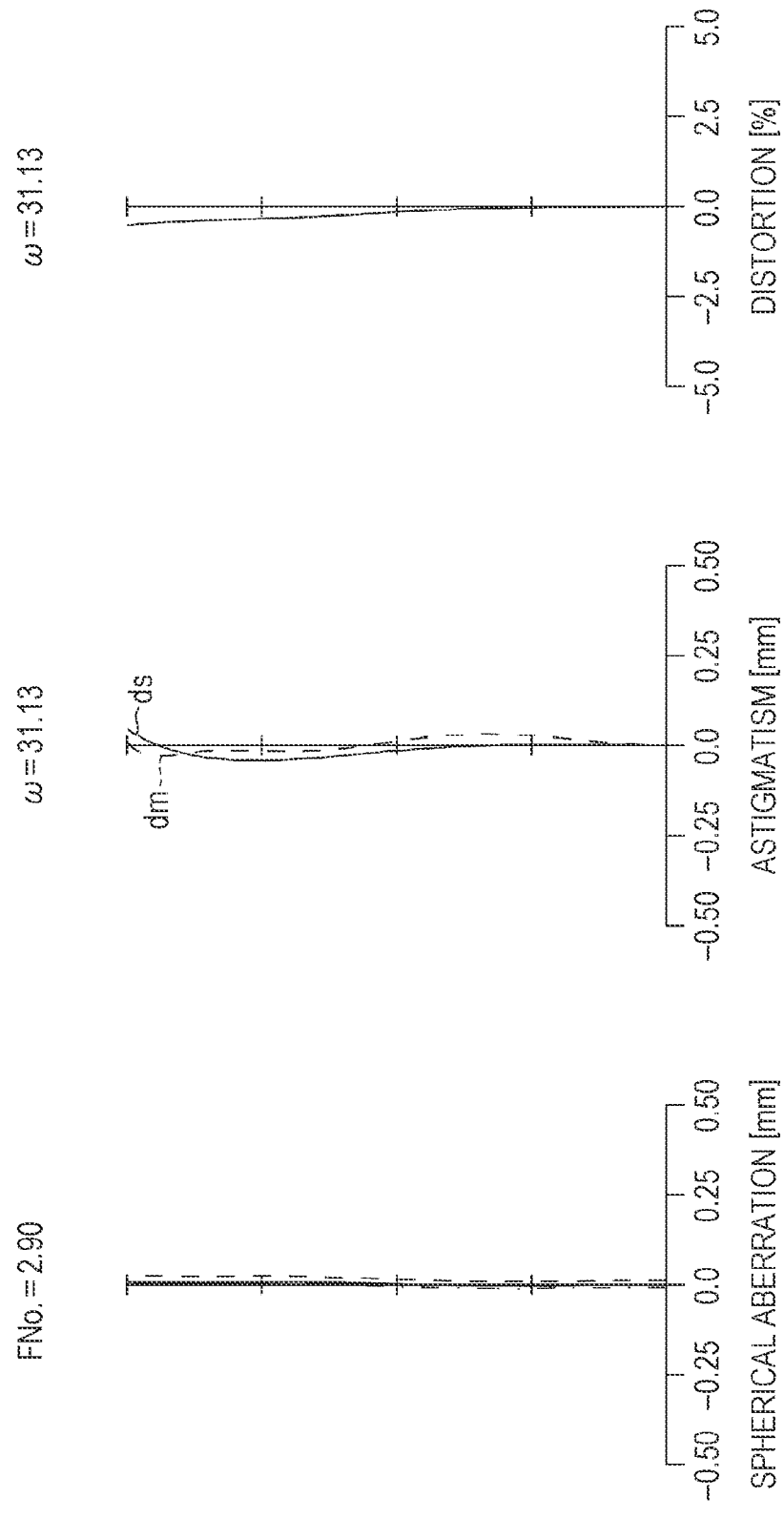
FIG. 10 is a spherical aberration diagram, an astigmatism diagram, and a distortion diagram at the wide-angle end of the zoom lens of Example 3 in an in-focus state on infinity.
Figure 11:
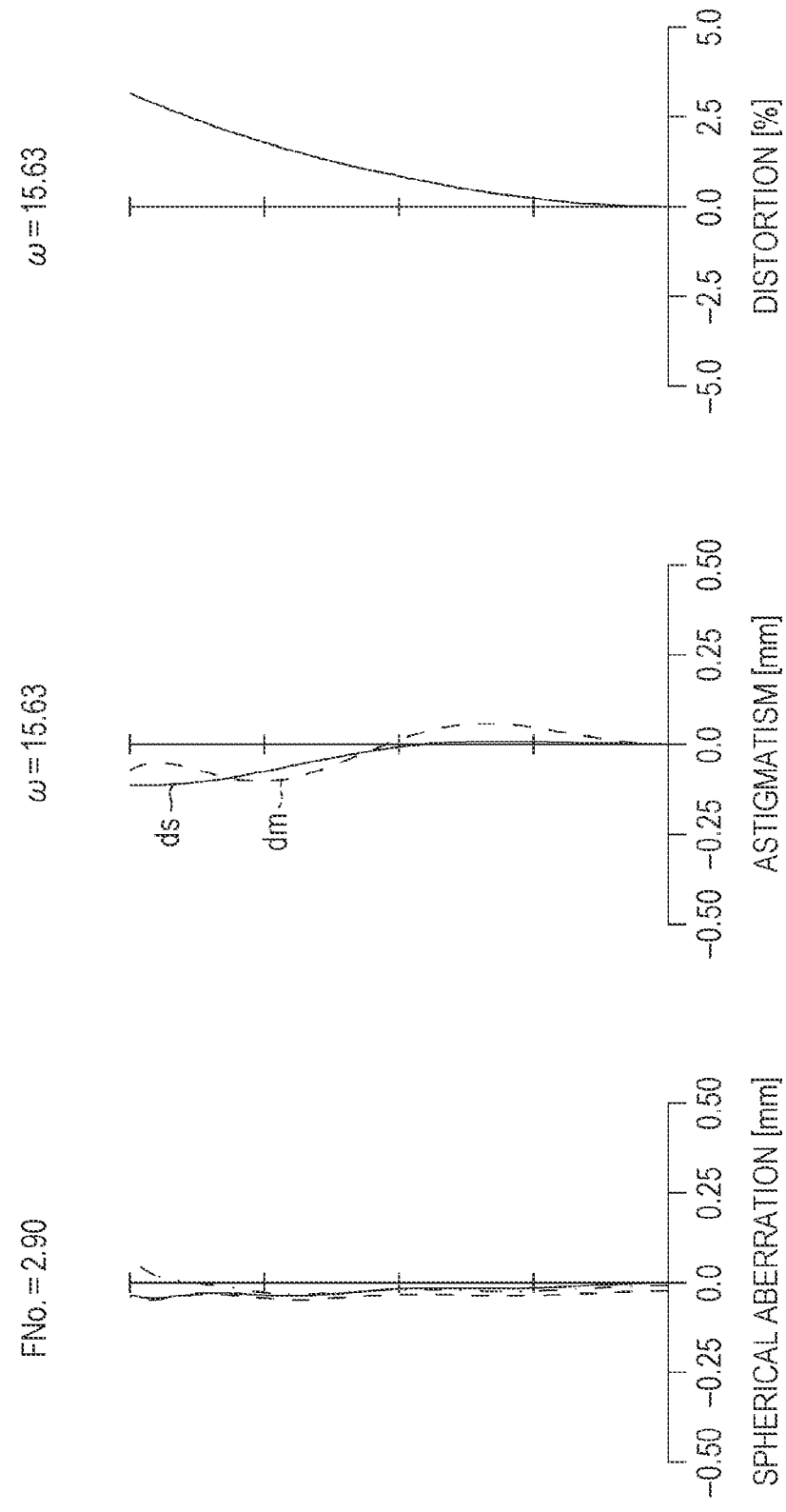
FIG. 11 is a spherical aberration diagram, an astigmatism diagram, and a distortion diagram at infinity at an intermediate focal length of the zoom lens of Example 3 in an in-focus state on infinity.
Figure 12:
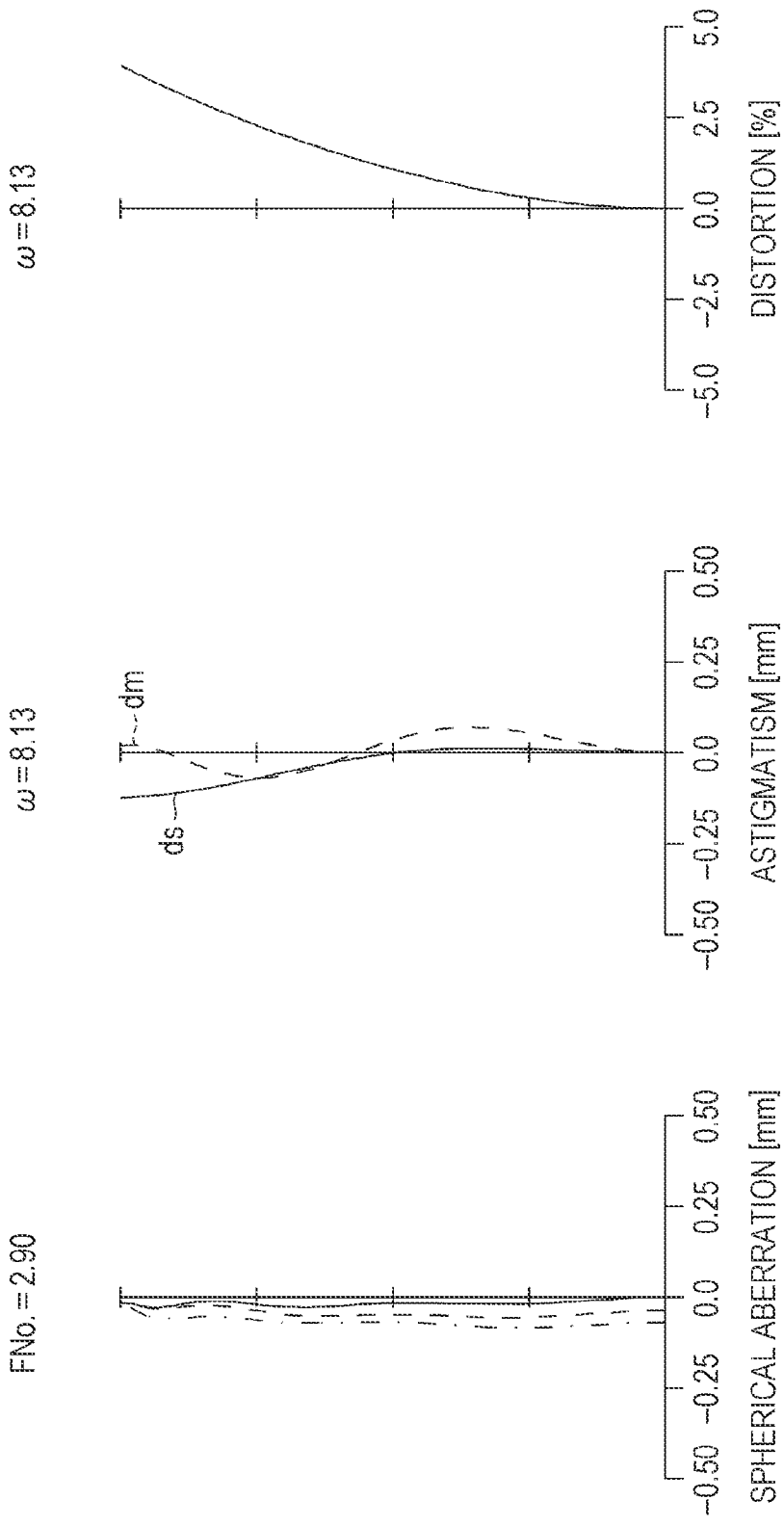
FIG. 12 is a spherical aberration diagram, an astigmatism diagram, and a distortion diagram at the telephoto end of the zoom lens of Example 3 in an in-focus state on infinity.

Next, numerical examples to which specific numerical values of the zoom lens are applied will be described. Hereinafter, "lens data", "specification table", "variable space", "lens group data", and "aspherical coefficient" are illustrated. FIGS. 10 to 12 illustrate longitudinal aberration diagrams of the zoom lens at the wide-angle end, the intermediate focal length, and the telephoto end in an in-focus state on infinity.

[Lens Data]

| Surface number | r | d | nd | vd |
|---|---|---|---|---|
| Object surface | ∞ | d(0) | | |
| 1 | 146.1366 | 1.5000 | 1.83400 | 37.34 |
| 2 | 81.7552 | 9.3137 | 1.49700 | 81.61 |
| 3 | 861.3257 | 0.2000 | | |
| 4 | 82.7093 | 8.3556 | 1.49700 | 81.61 |
| 5 | 676.6604 | d(5) | | |
| 6 | 85.3165 | 1.3000 | 1.83481 | 42.72 |
| 7 | 25.6981 | 7.5590 | | |
| 8 | −142.6415 | 1.0000 | 1.74320 | 49.34 |
| 9 | 55.4796 | 0.2000 | | |
| 10 | 47.2962 | 6.3639 | 1.85478 | 24.80 |
| 11 | −113.4071 | 7.0406 | | |
| 12 | −37.5431 | 1.2000 | 1.69350 | 53.18 |
| 13ASPH | −134.4780 | d(13) | | |
| 14S | ∞ | 1.2000 | | |
| 15 | 63.2111 | 2.9054 | 1.92286 | 20.88 |
| 16 | 226.7728 | 0.2000 | | |
| 17 | 38.8943 | 4.9773 | 1.59282 | 68.62 |
| 18 | −1849.7343 | 1.4534 | | |
| 19 | 29.4393 | 0.9000 | 1.85478 | 24.80 |
| 20 | 18.5276 | 4.1898 | 1.49700 | 81.61 |
| 21 | 29.5363 | 3.1986 | | |
| 22 | 855.4291 | 5.1841 | 1.61800 | 63.39 |
| 23 | −25.1253 | 0.9000 | 1.90366 | 31.31 |
| 24 | −91.9678 | 2.3316 | | |
| 25ASPH | −26.3081 | 1.2000 | 1.80139 | 45.45 |
| 26ASPH | −167.3759 | d(26) | | |

-continued

[Lens Data]

| Surface number | r | d | nd | vd |
|---|---|---|---|---|
| 27 | 31.8380 | 8.8367 | 1.61800 | 63.39 |
| 28 | −31.7511 | 1.0000 | 1.90366 | 31.31 |
| 29 | −50.0420 | 0.2000 | | |
| 30ASPH | 44.2400 | 3.9298 | 1.69350 | 53.18 |
| 31ASPH | −78.2641 | d(31) | | |
| 32 | 58.2654 | 0.9000 | 1.74320 | 49.34 |
| 33 | 21.9303 | d(33) | | |
| 34 | 744.8727 | 4.4762 | 1.85478 | 24.80 |
| 35 | −37.2427 | 0.2000 | | |
| 36 | −51.7059 | 0.9000 | 1.69680 | 55.46 |
| 37 | 1480.1035 | 4.7920 | | |
| 38ASPH | −26.0320 | 1.5000 | 1.69350 | 53.18 |
| 39ASPH | −126.4177 | d(39) | | |
| 40 | ∞ | 2.5000 | 1.51680 | 64.20 |
| 41 | ∞ | 1.0000 | | |
| Image plane | ∞ | | | |

[Specification Table]

| | Wide-angle end | Intermediate | Telephoto end |
|---|---|---|---|
| f | 36.0059 | 74.9901 | 145.7846 |
| FNo. | 2.9006 | 2.8998 | 2.8998 |
| ω | 31.1279 | 15.6292 | 8.1277 |
| Y | 21.6330 | 21.6330 | 21.6330 |

[Variable space]

| | Wide-angle end | Intermediate | Telephoto end | Wide-angle end | Intermediate | Telephoto end |
|---|---|---|---|---|---|---|
| d(0) | ∞ | ∞ | ∞ | 635.0001 | 611.8245 | 580.0000 |
| d(5) | 0.8000 | 29.1008 | 69.2054 | 0.8000 | 29.1008 | 69.2054 |
| d(13) | 29.3573 | 11.3694 | 1.4150 | 29.3573 | 11.3694 | 1.4150 |
| d(26) | 2.2384 | 1.2452 | 1.1000 | 2.2384 | 1.2452 | 1.1000 |
| d(31) | 1.4465 | 1.9362 | 1.3013 | 2.1191 | 3.6157 | 6.5754 |
| d(33) | 14.7502 | 14.2606 | 14.8955 | 14.0776 | 12.5811 | 9.6214 |
| d(39) | 13.4999 | 27.3558 | 29.1753 | 13.4999 | 27.3558 | 29.1753 |

[Lens group data]

| Group No. | Focal length |
|---|---|
| G1 | 159.7390 |
| G2 | −31.9650 |
| G3 | 126.1290 |
| G4 | 20.742b |
| G5 | −47.8230 |
| G6 | −104.4690 |

[Aspherical Coefficient]

| Surface number | k | A4 | A6 | A8 | A10 | A12 |
|---|---|---|---|---|---|---|
| 13 | 0.0000 | −2.65487E−06 | −1.22600E−10 | −2.58257E−12 | 4.62558E−15 | 0.00000E+00 |
| 25 | 0.5134 | 1.97238E−05 | −2.13070E−08 | 7.83567E−11 | −1.98213E−14 | 5.86672E−16 |
| 26 | 0.0000 | 7.14119E−06 | −2.93204E−08 | 3.91664E−11 | 1.04289E−13 | 0.00000E+00 |
| 30 | −0.6513 | −1.39550E−05 | −3.65922E−08 | 3.26993E−10 | −2.28508E−12 | 7.69238E−15 |
| 31 | 0.0000 | 1.03345E−05 | −5.83570E−08 | 5.03203E−10 | −2.90518E−12 | 8.96723E−15 |
| 38 | 0.0000 | −1.93371E−05 | 1.06017E−07 | −2.76968E−10 | 1.71864E−13 | 0.00000E+00 |
| 39 | 0.0000 | −2.32872E−05 | 8.81158E−08 | −2.48036E−10 | 2.09154E−13 | 0.00000E+00 |

EXAMPLE 4

(1) Optical Configuration

Figure 13:
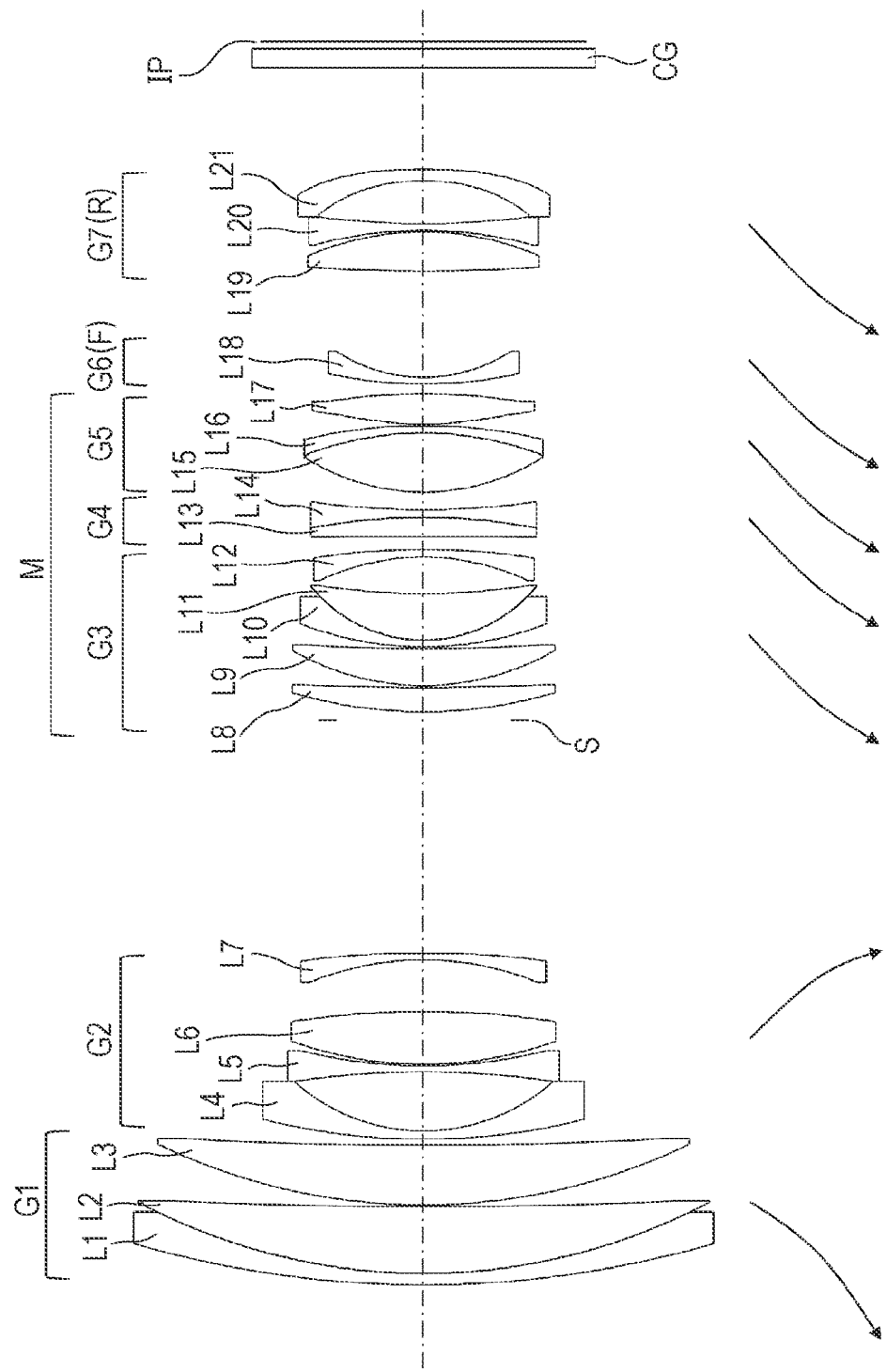
FIG. 13 is a lens cross-sectional view of a zoom lens at a wide-angle end according to Example 4.

FIG. 13 is a cross-sectional view of the zoom lens according to Example 4 of the present invention at the wide-angle end in an in-focus state on infinity. The zoom lens according to Example 4 includes, in order from the object side, the first lens group G1 having positive refractive power, the second lens group G2 having negative refractive power, the third lens group G3 having positive refractive power, the fourth lens group G4 having negative refractive power, the fifth lens group G5 having positive refractive power, the sixth lens group G6 having negative refractive power, and a seventh lens group G7 having negative refractive power. The intermediate group N includes the third lens group G3, the fourth lens group G4, and the fifth lens group G5. The sixth lens group G6 corresponds to the lens group F. The seventh lens group G7 corresponds to the rear group R.

In zooming from the wide-angle end to the telephoto end, the first lens group G1 moves toward the object, the second lens group G2 moves toward the image, the third lens group G3 moves toward the object, the fourth lens group G4 moves toward the object, the fifth lens group G5 moves toward the object, the sixth lens group G6 moves toward the object, and the seventh lens group G7 moves toward the object.

Focusing from an infinite-distance object to a short-distance object is performed by the sixth lens group G6 (lens group F) moving toward the image. An aperture stop S is disposed adjacent to the third lens group G3 and closer to the object than the third lens group G3.

Hereinafter, the configuration of each lens group will be described.

The first lens group G1 includes, in order from the object side, a cemented lens in which the negative meniscus lens L1 having a convex surface facing an object and a positive meniscus lens L2 having a convex surface facing an object are cemented, and the positive meniscus lens L3 having a convex surface facing an object.

The second lens group G2 includes, in order from the object side, the negative meniscus lens L4 having a convex surface facing an object, a biconcave lens L5, a biconvex lens L6, and the negative meniscus lens L7 having a concave surface facing an object. The negative meniscus lens L7 is a glass molded aspherical lens having a surface, facing the image, in an aspherical shape.

The third lens group G3 includes, in order from the object side, the positive meniscus lens L8 with a convex surface facing an object, the positive meniscus lens L9 with a convex surface facing an object, a cemented lens in which the negative meniscus lens L10 with a convex surface facing an object and the positive meniscus lens L11 with a convex surface facing an object are cemented, and a negative meniscus lens L12 with a concave surface facing an object. The negative meniscus lens L12 is a glass molded aspherical lens having a surface, facing an object, in an aspherical shape. The cemented surface between the negative meniscus lens L10 and the positive meniscus lens L11 is a diverging surface, which is the lens surface Si (S1) according to the present invention. In addition, an air lens having a biconvex shape is formed between the positive meniscus lens L11 and the negative meniscus lens L12, and has negative refractive power. The lens surface, closest to the object, of the third lens group (intermediate group M) is convex toward the object.

The fourth lens group G4 includes, in order from the object side, a cemented lens in which a positive meniscus lens L13 having a concave surface facing an object and the biconcave lens L14 are cemented. The cemented surface of the cemented lens is also a diverging surface and is the lens surface Si (S2) according to the present invention.

The fifth lens group G5 includes, in order from the object side, a cemented lens in which the biconvex lens L15 and the negative meniscus lens L16 having a concave surface facing an object are cemented, and the biconvex lens L17. The biconvex lens L17 is a glass molded aspherical lens having both surfaces in an aspherical shape. The cemented surface between the biconvex lens L15 and the negative meniscus lens L16 is a diverging surface, and the cemented surface is also a lens surface Si (S3) according to the present invention. The lens surface, closest to the image, of the fifth lens group (intermediate Group M) is convex toward the image.

The sixth lens group G6 includes the negative meniscus lens L18 having a convex surface facing an object.

The seventh lens group G7 includes, in order from the object side, the biconvex lens L19, a biconcave lens L20, and the negative meniscus lens L21 with a concave surface facing an object. The negative meniscus lens L21 is a glass molded aspherical lens having both surfaces in an aspherical shape.

(2) Numerical Examples

Figure 14:
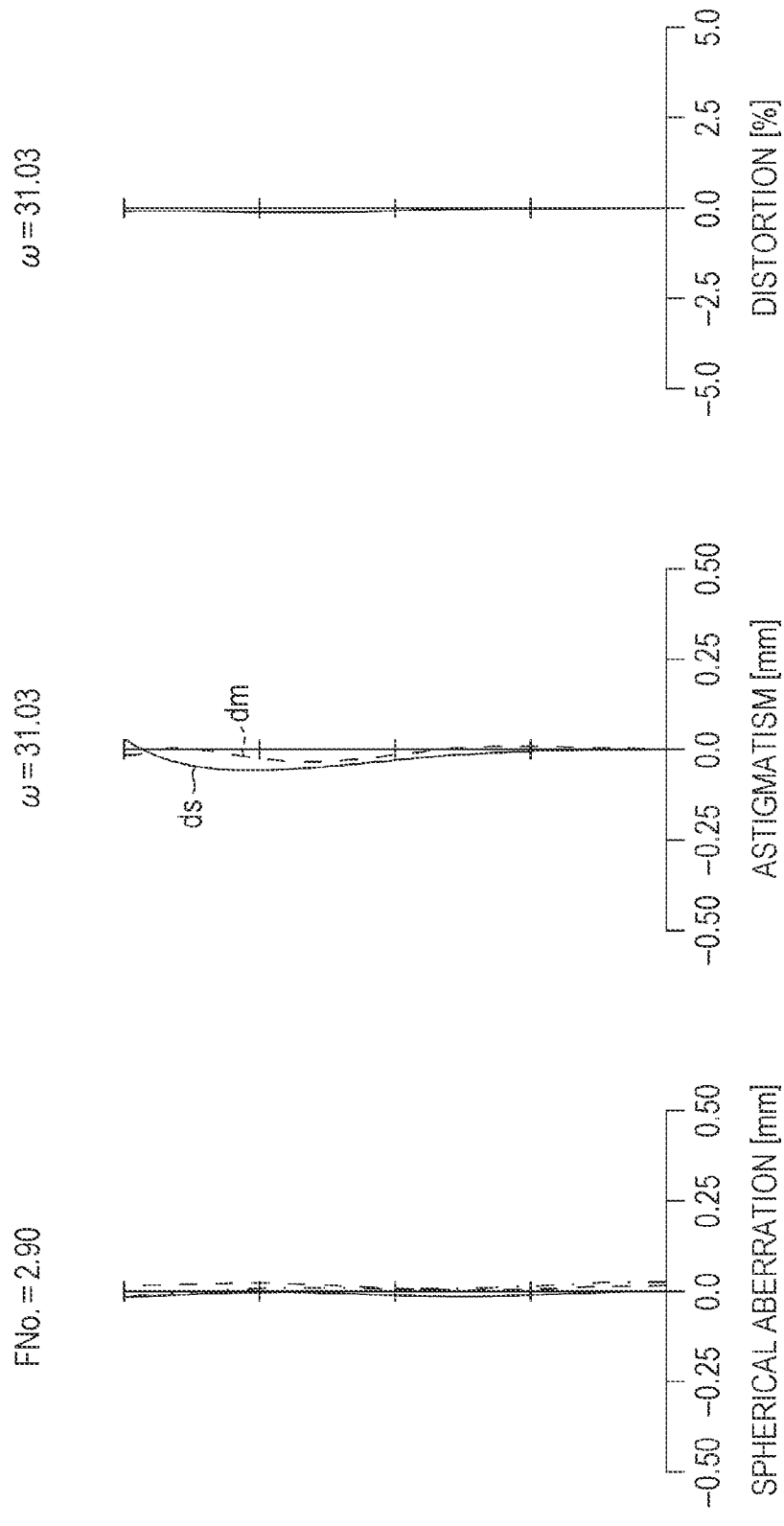
FIG. 14 is a spherical aberration diagram, an astigmatism diagram, and a distortion diagram at the wide-angle end of the zoom lens of Example 4 in an in-focus state on infinity.
Figure 15:
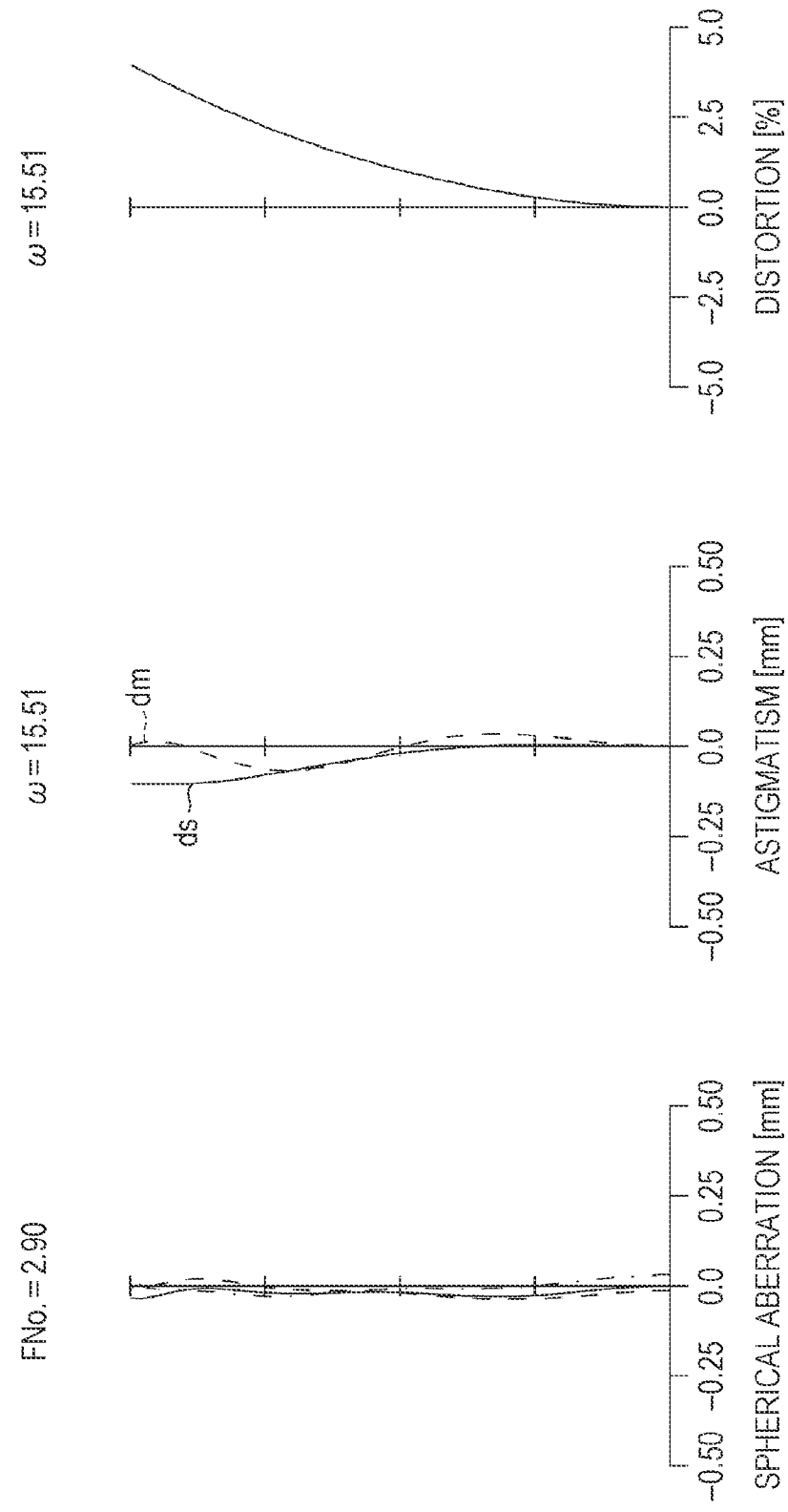
FIG. 15 is a spherical aberration diagram, an astigmatism diagram, and a distortion diagram at infinity a an intermediate focal length of the zoom lens according to Example 4 in an in-focus state on infinity.
Figure 16:
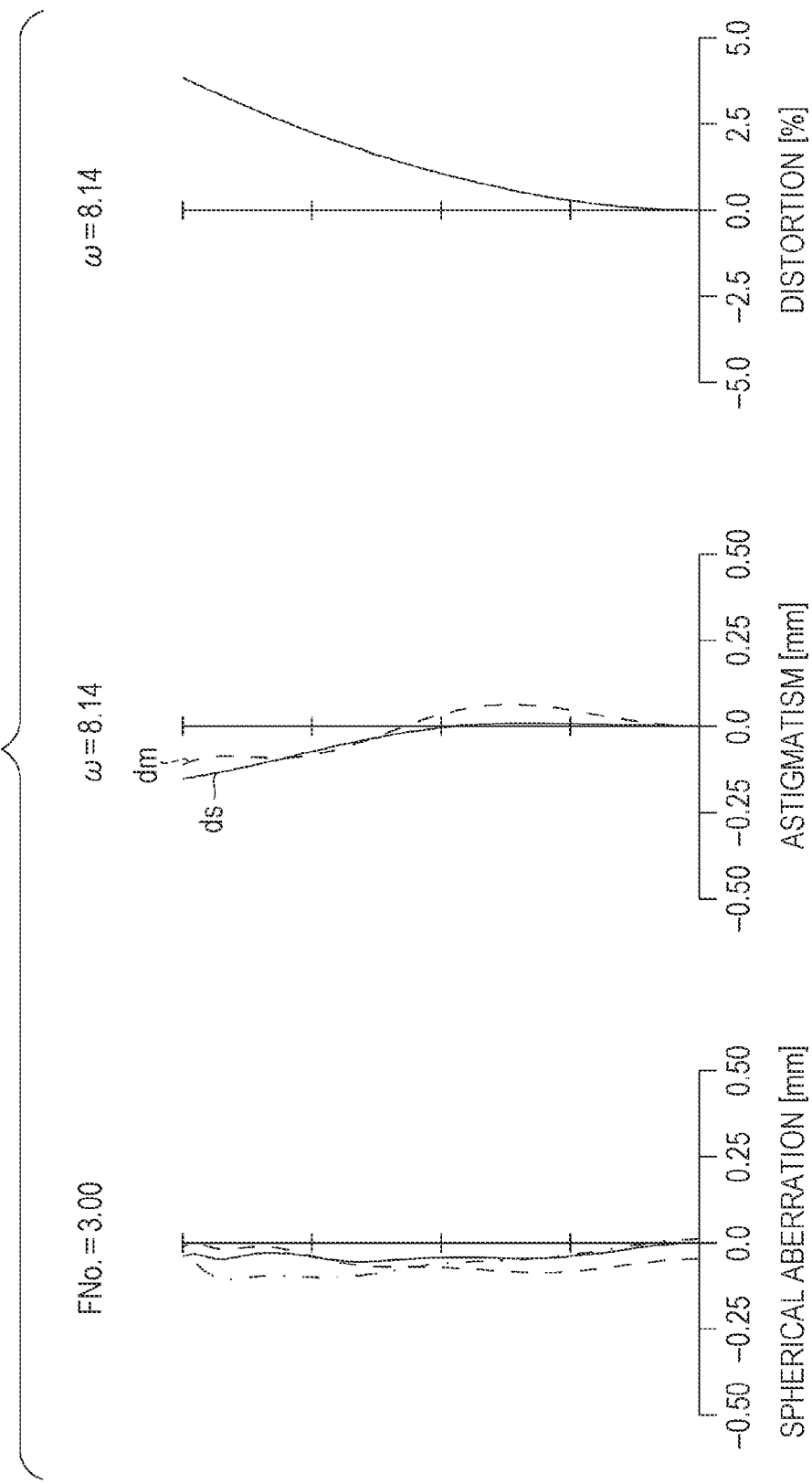
FIG. 16 is a spherical aberration diagram, an astigmatism diagram, and a distortion diagram at the telephoto end of the zoom lens of Example 4 in an in-focus state on infinity.

Next, numerical examples to which specific numerical values of the zoom lens are applied will be described. Hereinafter, "lens data", "specification table", "variable space", "lens group data", and "aspherical coefficient" are illustrated. FIGS. 14 to 16 illustrate longitudinal aberration diagrams of the zoom lens at the wide-angle end, the intermediate focal length, and the telephoto end in an in-focus state on infinity.

[Lens Data]

| Surface number | r | d | nd | vd |
|---|---|---|---|---|
| Object surface | ∞ | d(0) | | |
| 1 | 139.2743 | 1.5000 | 1.83400 | 37.34 |
| 2 | 80.8526 | 8.8653 | 1.49700 | 81.61 |
| 3 | 803.6530 | 0.2000 | | |
| 4 | 81.1675 | 7.9247 | 1.49700 | 81.61 |
| 5 | 583.4053 | d(5) | | |
| 6 | 87.4206 | 1.1000 | 1.83481 | 42.72 |
| 7 | 25.7644 | 7.8524 | | |
| 8 | −119.3781 | 0.8000 | 1.74320 | 49.34 |
| 9 | 67.2695 | 0.2000 | | |
| 10 | 51.6133 | 7.0019 | 1.85478 | 24.80 |
| 11 | −115.7829 | 6.8773 | | |
| 12 | −39.5414 | 0.9000 | 1.69350 | 53.18 |
| 13ASPH | −141.6106 | d(13) | | |
| 14S | ∞ | 1.2000 | | |
| 15 | 61.7151 | 3.2551 | 1.92286 | 20.88 |
| 16 | 416.2702 | 0.2000 | | |
| 17 | 34.7681 | 4.9378 | 1.69680 | 55.46 |
| 18 | 276.0065 | 0.2000 | | |
| 19 | 44.9113 | 0.9000 | 1.90366 | 31.31 |
| 20 | 19.2137 | 6.2102 | 1.49700 | 81.61 |
| 21 | 94.1309 | 4.8400 | | |
| 22ASPH | −30.3282 | 1.0000 | 1.88202 | 37.22 |
| 23 | −93.5565 | d(23) | | |
| 24 | −1065.8143 | 2.4898 | 1.61800 | 63.39 |
| 25 | −80.2742 | 1.0000 | 1.80000 | 29.84 |
| 26 | 103.2242 | d(26) | | |

-continued

[Lens Data]

| Surface number | r | d | nd | vd |
|---|---|---|---|---|
| 27 | 29.4295 | 7.8340 | 1.61800 | 63.39 |
| 28 | −43.6080 | 1.0000 | 1.92286 | 20.88 |
| 29 | −68.8061 | 0.2000 | | |
| 30ASPH | 42.2696 | 4.0064 | 1.69350 | 53.18 |
| 31ASPH | −77.3433 | d(31) | | |
| 32 | 57.6851 | 0.9000 | 1.80100 | 34.97 |
| 33 | 21.1862 | d(33) | | |
| 34 | 199.3862 | 5.2186 | 1.92286 | 20.88 |
| 35 | −38.7197 | 0.2000 | | |
| 36 | −55.4247 | 0.9000 | 1.78800 | 47.37 |
| 37 | 108.8800 | 5.6525 | | |
| 38ASPH | −30.2311 | 1.5000 | 1.69350 | 53.18 |
| 39ASPH | −105.6295 | d(39) | | |
| 40 | ∞ | 2.5000 | 1.51680 | 64.20 |
| 41 | ∞ | 1.0000 | | |
| Image plane | ∞ | | | |

[Specification Table]

| | Wide-angle end | Intermediate | Telephoto end |
|---|---|---|---|
| f | 36.0004 | 74.9885 | 145.7856 |
| FNo. | 2.9001 | 2.8997 | 2.9998 |
| ω | 31.0270 | 15.5127 | 8.1372 |
| Y | 21.6330 | 21.6330 | 21.6330 |

[Variable space]

| | Wide-angle end | Intermediate | Telephoto end | Wide-angle end | Intermediate | Telephoto end |
|---|---|---|---|---|---|---|
| d(0) | ∞ | ∞ | ∞ | 635.0001 | 615.1959 | 585.5508 |
| d(5) | 0.8000 | 29.7508 | 64.2989 | 0.8000 | 29.7508 | 64.2989 |
| d(13) | 30.8194 | 11.3507 | 1.4257 | 30.8194 | 11.3507 | 1.4257 |
| d(23) | 1.7599 | 1.5879 | 1.0000 | 1.7599 | 1.5879 | 1.0000 |
| d(26) | 2.3709 | 1.0000 | 1.0000 | 2.3709 | 1.0000 | 1.0000 |
| d(31) | 1.2999 | 2.3225 | 1.3010 | 1.8804 | 3.9105 | 5.7542 |
| d(33) | 14.0840 | 13.0613 | 14.0828 | 13.5035 | 11.4734 | 9.6297 |
| d(39) | 13.4999 | 25.3650 | 30.9748 | 13.4999 | 25.3650 | 30.9748 |

[Lens group data]

| Group No. | Focal length |
|---|---|
| G1 | 155.0100 |
| G2 | −32.1233 |
| G3 | 71.8735 |
| G4 | −94.1760 |
| G5 | 20.7231 |
| G6 | −42.2663 |
| G7 | −124.0100 |

[Aspherical Coefficient]

| Surface number | k | A4 | A6 | A8 | A10 | A12 |
|---|---|---|---|---|---|---|
| 13 | 0.0000 | −2.26600E−06 | −5.89495E−10 | −1.04773E−13 | −7.05346E−17 | 0.00000E+00 |
| 22 | 1.2368 | 1.14559E−05 | 7.55290E−09 | 6.15810E−11 | −2.59015E−13 | 7.36037E−16 |
| 30 | 0.9420 | −1.82076E−05 | −6.83016E−08 | 4.75485E−10 | −3.01866E−12 | 9.80190E−15 |
| 31 | 0.0000 | 7.35164E−06 | −8.00142E−08 | 6.57393E−10 | −3.71202E−12 | 1.11947E−14 |
| 38 | 0.0000 | −4.76863E−05 | 1.79181E−07 | −4.00126E−10 | −2.13880E−13 | 0.00000E+00 |
| 39 | 0.0000 | −4.65785E−05 | 1.80790E−07 | −5.00836E−10 | 3.72019E−13 | 0.00000E+00 |

EXAMPLE 5

(1) Optical Configuration

Figure 17:
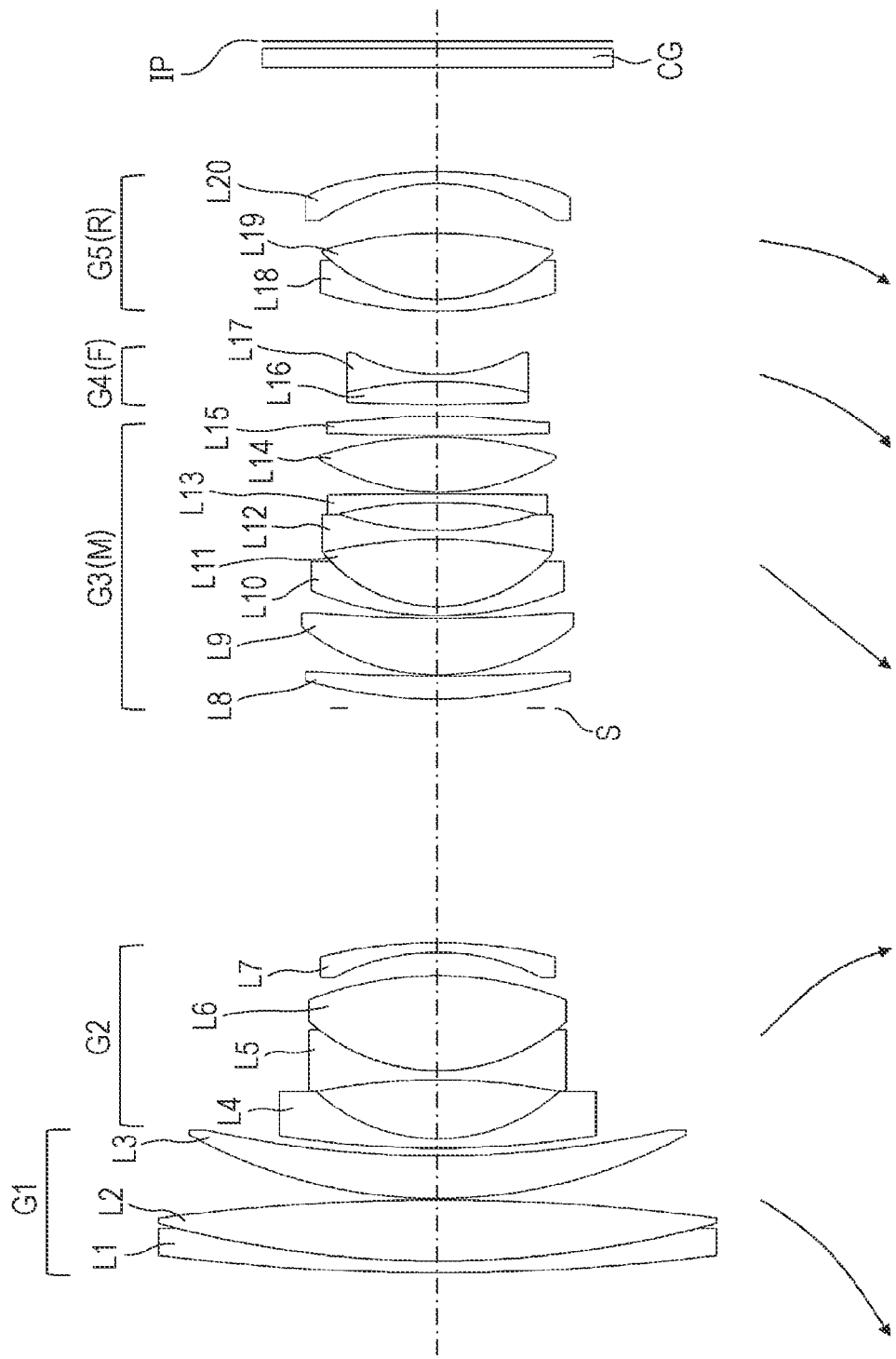
FIG. 17 is a lens cross-sectional view at a wide-angle end of a zoom lens of Example 5.

FIG. 17 is a cross-sectional view of the zoom lens according to Example 5 of the present invention at the wide-angle end in an in-focus state on infinity. The zoom lens according to Example 5 includes, in order from the object side, the first lens group G1 having positive refractive power, the second lens group G2 having negative refractive power, the third lens group G3 having positive refractive power, the fourth lens group G4 having negative refractive power, and the fifth lens group G5 having positive refractive power. The third lens group G3 corresponds to the intermediate group M. The fourth lens group G4 corresponds to the lens group F. The fifth lens group G5 corresponds to the rear group R.

In zooming from the wide-angle end to the telephoto end, the first lens group G1 moves toward the object, the second lens group G2 moves toward the image, the third lens group G3 moves toward the object, the fourth lens group G4 moves toward the object, and the fifth lens group G5 moves toward the object.

Focusing from an infinite-distance object to a short-distance object is performed by the fourth lens group G4 (lens group F) moving toward the image.

An aperture stop S is disposed adjacent to the third lens group G3 and closer to the object than the third lens Group G3.

Hereinafter, the configuration of each lens group will be described.

The first lens group G1 includes, in order from the object side, a cemented lens in which a negative meniscus lens L1 and a biconvex lens L2 each having a convex surface facing an object are cemented, and a positive meniscus lens L3 having a convex surface facing an object.

The second lens group G2 includes, in order from the object side, the negative meniscus lens L4 having a convex surface facing an object, a cemented lens in which the biconcave lens L5 and the biconvex lens L6 are cemented, and a negative meniscus lens L7 having a concave surface facing an object. The negative meniscus lens L7 is a glass molded aspherical lens having a surface, facing the image, in an aspherical shape.

The third lens group G3 includes, in order from the object side, the positive meniscus lens L8 with a convex surface facing an object, a positive meniscus lens L9 with a convex surface facing an object, cemented lens in which three lenses of the negative meniscus lens L10 with a convex surface facing an object, a biconvex lens L11, and the biconcave lens L12 are cemented, the negative meniscus lens L13 with a concave surface facing an object, the biconvex lens L14, and the biconvex lens L15. The negative meniscus lens L13 is a glass molded aspherical lens having both surfaces in an aspherical shape. The biconvex lens L15 is a glass molded aspherical lens having both surfaces in an aspherical shape.

The cemented surface between the negative meniscus lens L10 and the biconvex lens L11 and the cemented surface between the biconvex lens L11 and the biconcave lens L12 are diverging surfaces, and these cemented surfaces are the lens surfaces Si (S1, S2) according to the present invention. In addition, an air lens having a biconvex shape is formed between the biconvex lens L12 and the negative meniscus lens L13, and has negative refractive power. The lens surface, closest to the object, of the third lens group is convex toward the object, and the lens surface closest to the image is convex toward the image.

A fourth lens group G4 includes a cemented lens in which the biconvex lens 116 and a biconcave lens L17 are cemented.

The fifth lens group G5 includes, in order from the object side, a cemented lens in which a negative meniscus lens L18 having a convex surface facing an object and a biconvex lens L19 are cemented, and a negative meniscus lens L20 having a concave surface facing an object. The negative meniscus lens L20 is a glass molded aspherical lens having both surfaces in an aspherical shape.

(2) Numerical Examples

Figure 18:
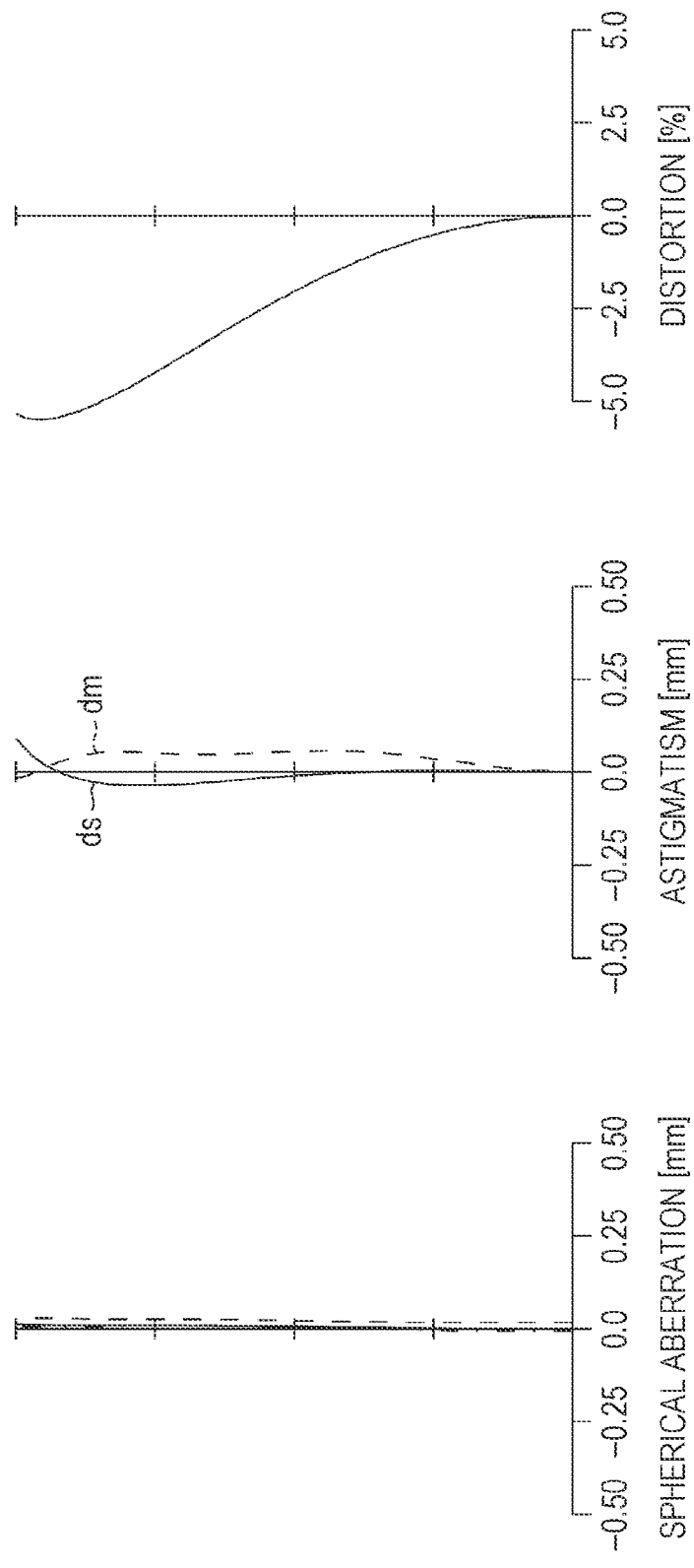
FIG. 18 is a spherical aberration diagram, an astigmatism diagram, and a distortion diagram at the wide-angle end of the zoom lens of Example 5 in an in-focus state on infinity.
Figure 19:
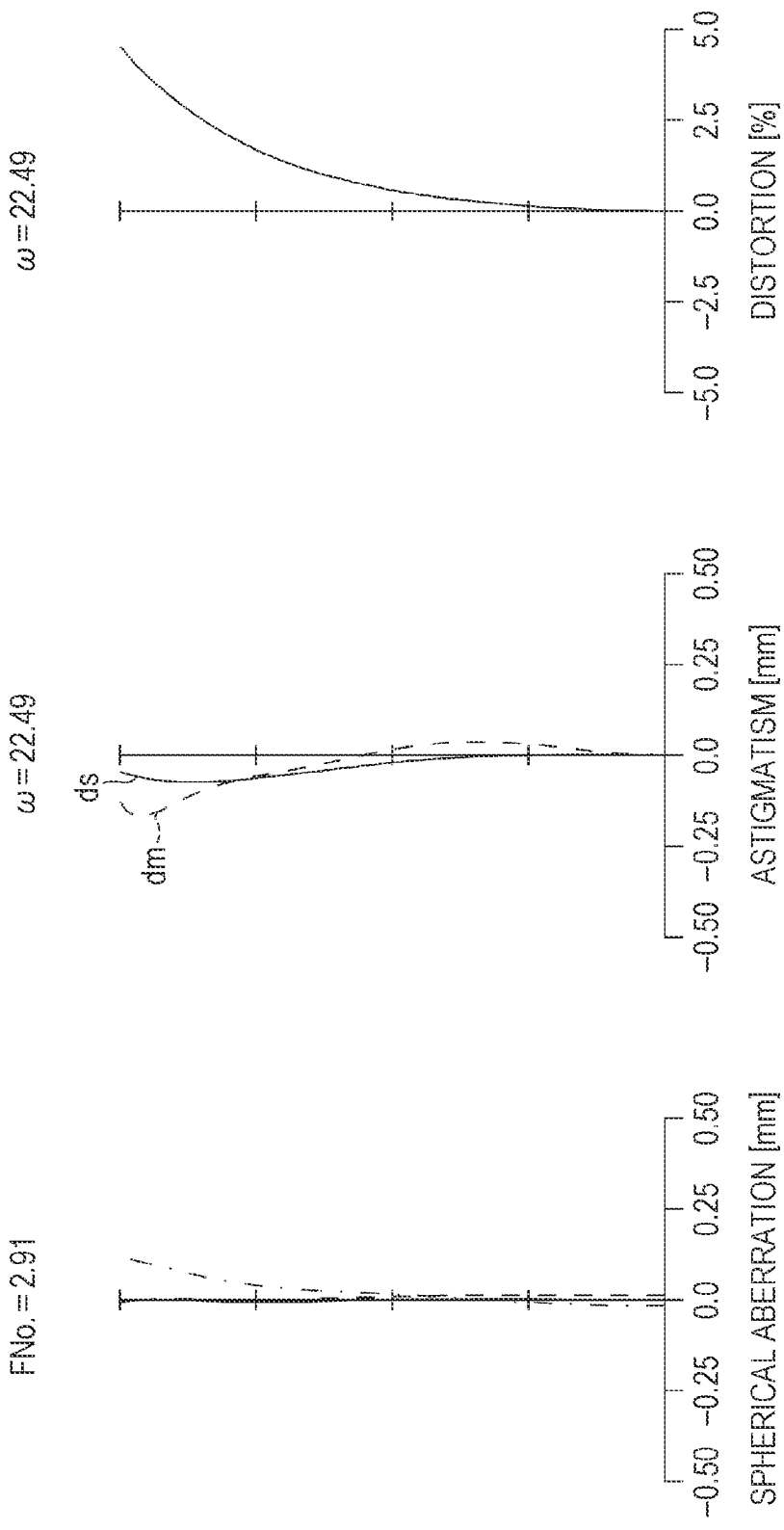
FIG. 19 is a spherical aberration diagram, an astigmatism diagram, and a distortion diagram at an intermediate focal length of the zoom lens according to Example 5 in an in-focus state on infinity.
Figure 20:
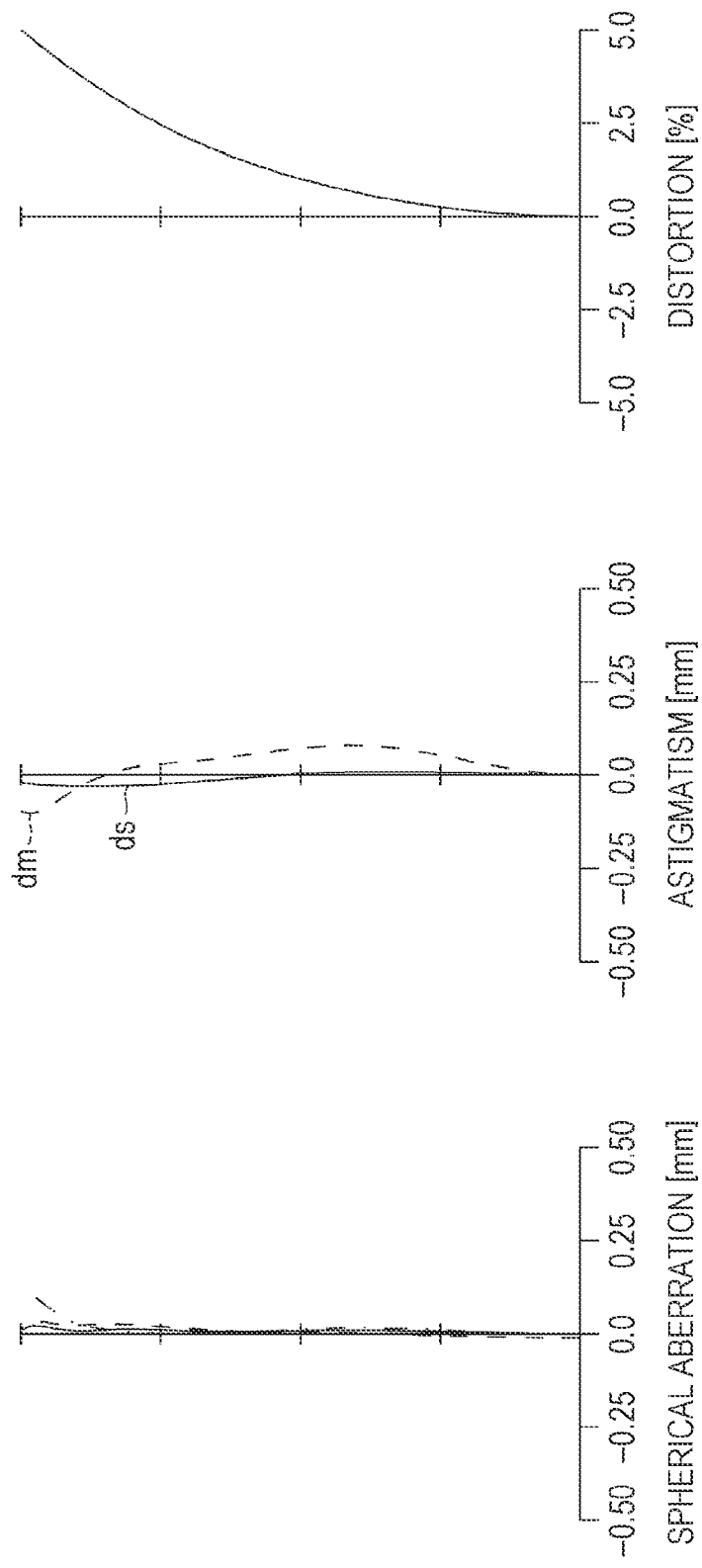
FIG. 20 is a spherical aberration diagram, an astigmatism diagram, and a distortion diagram at the telephoto end of the zoom lens of Example 5 in an in-focus state on infinity.

Next, numerical examples to which specific numerical values of the zoom lens are applied will be described. Hereinafter, "lens data", "specification table", "variable space", "lens group data", and "aspherical coefficient" are illustrated. FIGS. 18 to 20 illustrate longitudinal aberration diagrams of the zoom lens at the wide-angle end, the intermediate focal length, and the telephoto end in an in-focus state on infinity.

[Lens Data]

| Surface number | r | d | nd | vd |
|---|---|---|---|---|
| Object surface | ∞ | d(0) | | |
| 1 | 297.5731 | 1.5000 | 1.92119 | 23.96 |
| 2 | 137.7580 | 7.9005 | 1.59282 | 68.62 |
| 3 | −281.1578 | 0.2000 | | |
| 4 | 67.1396 | 5.5565 | 1.59282 | 68.62 |
| 5 | 137.6200 | d(5) | | |
| 6 | 132.8796 | 1.2000 | 1.88300 | 40.80 |
| 7 | 23.3857 | 7.6843 | | |

[Lens Data]

| Surface number | r | d | nd | vd |
|---|---|---|---|---|
| 8 | −81.8769 | 1.2000 | 1.75500 | 52.32 |
| 9 | 25.0947 | 12.3276 | 1.78880 | 28.43 |
| 10 | −45.9757 | 3.0568 | | |
| 11 | −29.1025 | 1.2000 | 1.85135 | 40.10 |
| 12ASPH | −73.0620 | d(12) | | |
| 13S | ∞ | 1.2000 | | |
| 14 | 63.4705 | 2.8962 | 1.92286 | 20.88 |
| 15 | 200.0000 | 0.2000 | | |
| 16 | 28.0309 | 7.3539 | 1.61800 | 63.39 |
| 17 | 170.0544 | 0.3589 | | |
| 18 | 43.3025 | 1.2000 | 1.85478 | 24.80 |
| 19 | 19.4226 | 8.6987 | 1.59282 | 68.62 |
| 20 | −68.0000 | 1.2000 | 1.90366 | 31.31 |
| 21 | 40.4480 | 3.5558 | | |
| 22ASPH | −79.5113 | 1.2000 | 1.88202 | 37.22 |
| 23ASPH | −244.9386 | 0.2000 | | |
| 24 | 29.6110 | 7.1754 | 1.61800 | 63.39 |
| 25 | −50.0966 | 0.2000 | | |
| 26ASPH | 1444.6811 | 2.5223 | 1.88202 | 37.22 |
| 27ASPH | −78.0022 | d(27) | | |
| 28 | 222.4190 | 3.0223 | 1.92119 | 23.96 |
| 29 | −48.0792 | 0.9000 | 1.78800 | 47.37 |
| 30 | 22.7893 | d(30) | | |

[Lens Data]

| Surface number | r | d | nd | vd |
|---|---|---|---|---|
| 31 | 51.4100 | 1.5000 | 1.90366 | 31.31 |
| 32 | 21.4867 | 8.6463 | 1.60562 | 43.71 |
| 33 | −50.6655 | 6.4054 | | |
| 34ASPH | −24.4947 | 1.5000 | 1.69350 | 53.18 |
| 35ASPH | −62.5408 | d(35) | | |
| 36 | ∞ | 2.5000 | 1.51680 | 64.20 |
| 37 | ∞ | 1.0000 | | |
| Image plane | ∞ | | | |

[Specification Table]

| | Wide-angle end | Intermediate | Telephoto end |
|---|---|---|---|
| f | 28.8086 | 49.9831 | 101.8857 |
| FNo. | 2.9114 | 2.9094 | 2.9097 |
| ω | 38.4220 | 22.4917 | 11.4289 |
| Y | 21.6330 | 21.6330 | 21.6330 |

[Variable space]

| | Wide-angle end | Intermediate | Telephoto end | Wide-angle end | Intermediate | Telephoto end |
|---|---|---|---|---|---|---|
| d(0) | ∞ | ∞ | ∞ | 640.0000 | 632.4574 | 605.4345 |
| d(5) | 1.0000 | 19.8699 | 48.7357 | 1.0000 | 19.8699 | 48.7357 |
| d(12) | 30.4980 | 12.5471 | 1.3000 | 30.4980 | 12.5471 | 1.3000 |
| d(27) | 1.4949 | 5.7522 | 7.6084 | 1.9137 | 6.8779 | 11.1287 |
| d(30) | 8.2462 | 8.6536 | 12.0080 | 7.8274 | 7.5279 | 8.4877 |
| d(35) | 13.5000 | 15.4589 | 19.6524 | 13.5000 | 15.4589 | 19.6524 |

[Lens group data]

| Group No. | Focal length |
|---|---|
| G1 | 133.6850 |
| G2 | −24.0282 |
| G3 | 29.3072 |
| G4 | −36.5784 |
| G5 | 1654.2900 |

[Aspherical Coefficient]

| Surface number | k | A4 | A6 | A8 | A10 | A12 |
|---|---|---|---|---|---|---|
| 12 | 0.0000 | −3.71224E−06 | −7.54248E−10 | −8.10446E−12 | 1.58508E−14 | 0.00000E+00 |
| 22 | 8.7544 | −3.73634E−06 | −9.94629E−08 | 2.10401E−10 | 2.38821E−13 | 5.85973E−16 |
| 23 | 0.0000 | 2.23671E−05 | −1.20692E−07 | 7.69895E−11 | 5.84925E−13 | 0.00000E+00 |
| 26 | 0.0000 | 2.26546E−05 | −9.98620E−08 | 2.72553E−10 | −2.12889E−12 | 5.61288E−15 |
| 27 | 0.0000 | 1.70547E−05 | −3.84960E−08 | 3.62167E−10 | −2.64544E−12 | 6.48480E−15 |
| 34 | 0.0000 | 2.24163E−06 | 9.38154E−08 | −2.94316E−10 | 1.98794E−13 | 0.00000E+00 |
| 35 | 0.0000 | −1.23427E−05 | 6.39381E−08 | −2.28462E−10 | 1.27360E−13 | 0.00000E+00 |

EXAMPLE 6

(1) Optical Configuration

Figure 21:
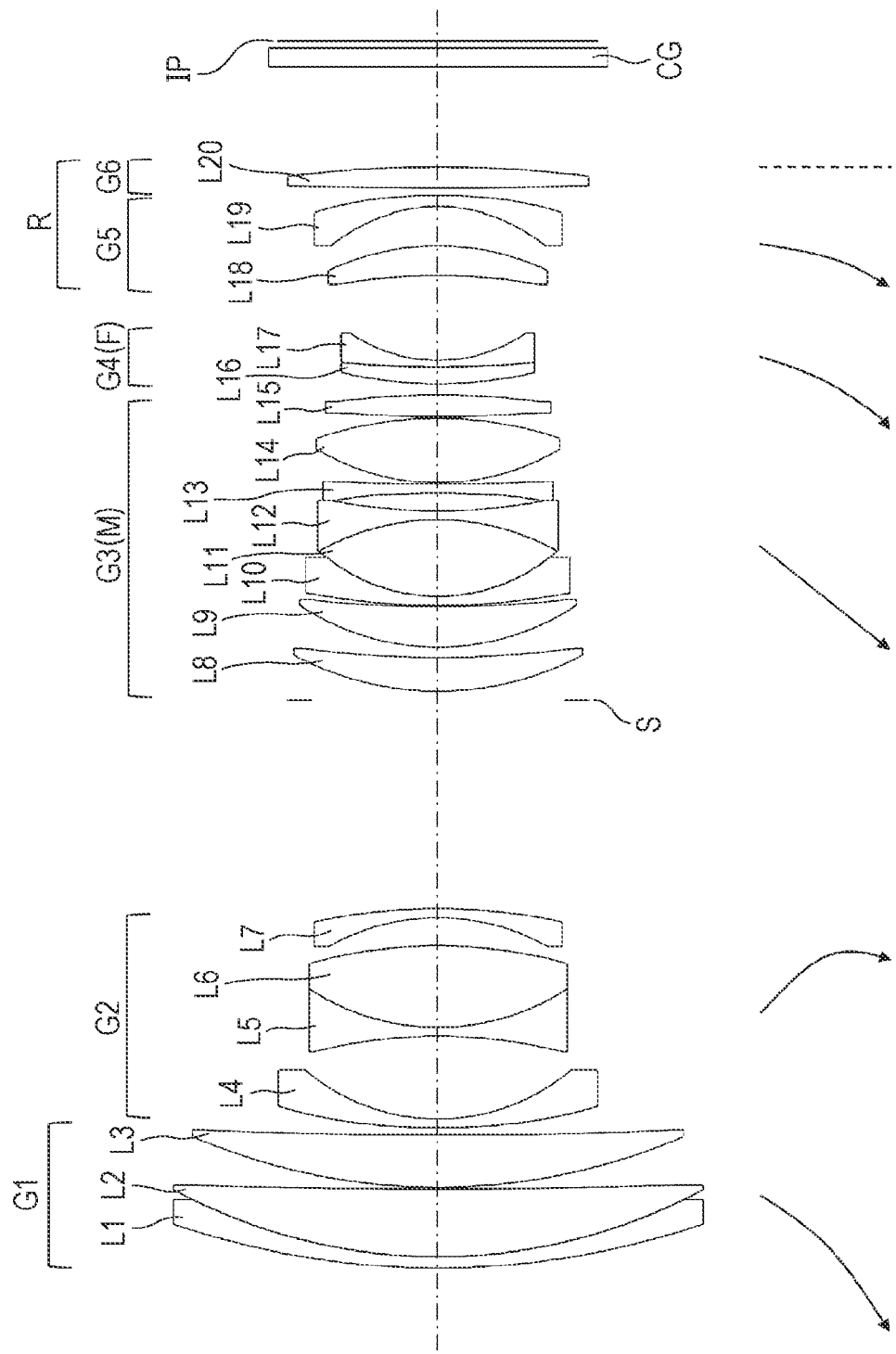
FIG. 21 is a lens cross-sectional view at a wide-angle end of a zoom lens of Example 6.

FIG. 21 is a cross-sectional view of the zoom lens according to Example 6 of the present invention at the wide-angle end in an in-focus state on infinity. The zoom lens according to Example 6 includes, in order from the object side, the first lens group G1 having positive refractive power, the second lens group G2 having negative refractive power, the third lens group G3 having positive refractive power, the fourth lens group G4 having negative refractive power, the fifth lens group G5 having negative refractive power, and the sixth lens group G6 having positive refractive power. The third lens group G3 corresponds to the intermediate group M. The fourth lens group G4 corresponds to the lens group F. The rear group R includes the fifth lens group G5 and the sixth lens group G6.

In zooming from the wide-angle end to the telephoto end, the first lens group G1 moves toward the object, the second lens group G2 moves toward the image, the third lens group G3 moves toward the object, the fourth lens group G4 moves toward the object, the fifth lens group G5 moves toward the object, and the sixth lens group G6 is fixed with respect to the optical axis.

Focusing from an infinite-distance object to a short-distance object is performed by the fourth lens group G4 (lens group F) moving toward the image.

An aperture stop S is disposed adjacent to the third lens group G3 and closer to the object than the third lens group G3.

Hereinafter, the configuration of each lens group will be described.

The first lens Group G1 includes, in order from the object side, a cemented lens in which the negative meniscus lens L1 having a convex surface facing an object and a positive meniscus lens L2 having a convex surface facing an object are cemented, and the positive meniscus lens L3 having a convex surface facing an object.

The second lens group G2 includes, in order from the object side, the negative meniscus lens L4 having a convex surface facing an object, a cemented lens in which the biconcave lens L5 and the biconvex lens L6 are cemented, and a negative meniscus lens L7 having a concave surface facing an object. The negative meniscus lens L4 is a glass molded aspherical lens having a surface, facing an object, in an aspherical shape. The negative meniscus lens L7 is a glass molded aspherical lens having a surface, facing the image, in an aspherical shape.

The third lens group G3 includes, in order from the object side, the positive meniscus lens L8 with a convex surface facing an object, the positive meniscus lens L9 with a convex surface facing an object, a cemented lens in which three lenses of the negative meniscus lens L10 with a convex surface facing an object, the biconvex lens L11, and the biconvex lens L12 are cemented, a biconcave lens L13, the biconvex lens L14, and the biconvex lens L15. The biconcave lens L13 is a glass molded aspherical lens having both surfaces in an aspherical shape. The biconvex lens L15 is a glass molded aspherical lens having both surfaces in an aspherical shape. The cemented surface between the negative meniscus lens L10 and the biconvex lens L11 and the cemented surface between the biconvex lens L11 and the biconcave lens L12 are diverging surfaces, and these cemented surfaces are the lens surfaces Si (S1, S2) according to the present invention. In addition, an air lens having a biconvex shape is formed between the biconcave lens L12 and the biconcave lens L13, and has negative refractive power. The lens surface, closest to the object, of the third lens group is convex toward the object, and the lens surface closest to the image is convex toward the image.

The fourth lens group G4 includes a cemented lens in which a positive meniscus lens L16 having a convex surface facing an object and a negative meniscus lens L17 having a convex surface facing an object are cemented.

The fifth lens group G5 includes, in order from the object side, a positive meniscus lens L18 having a concave surface facing an object, and the negative meniscus lens L19 having a concave surface facing an object. The negative meniscus lens L19 is a glass molded aspherical lens having both surfaces in an aspherical shape.

The sixth lens group G6 includes only the biconvex lens L20.

(2) Numerical Examples

Figure 22:
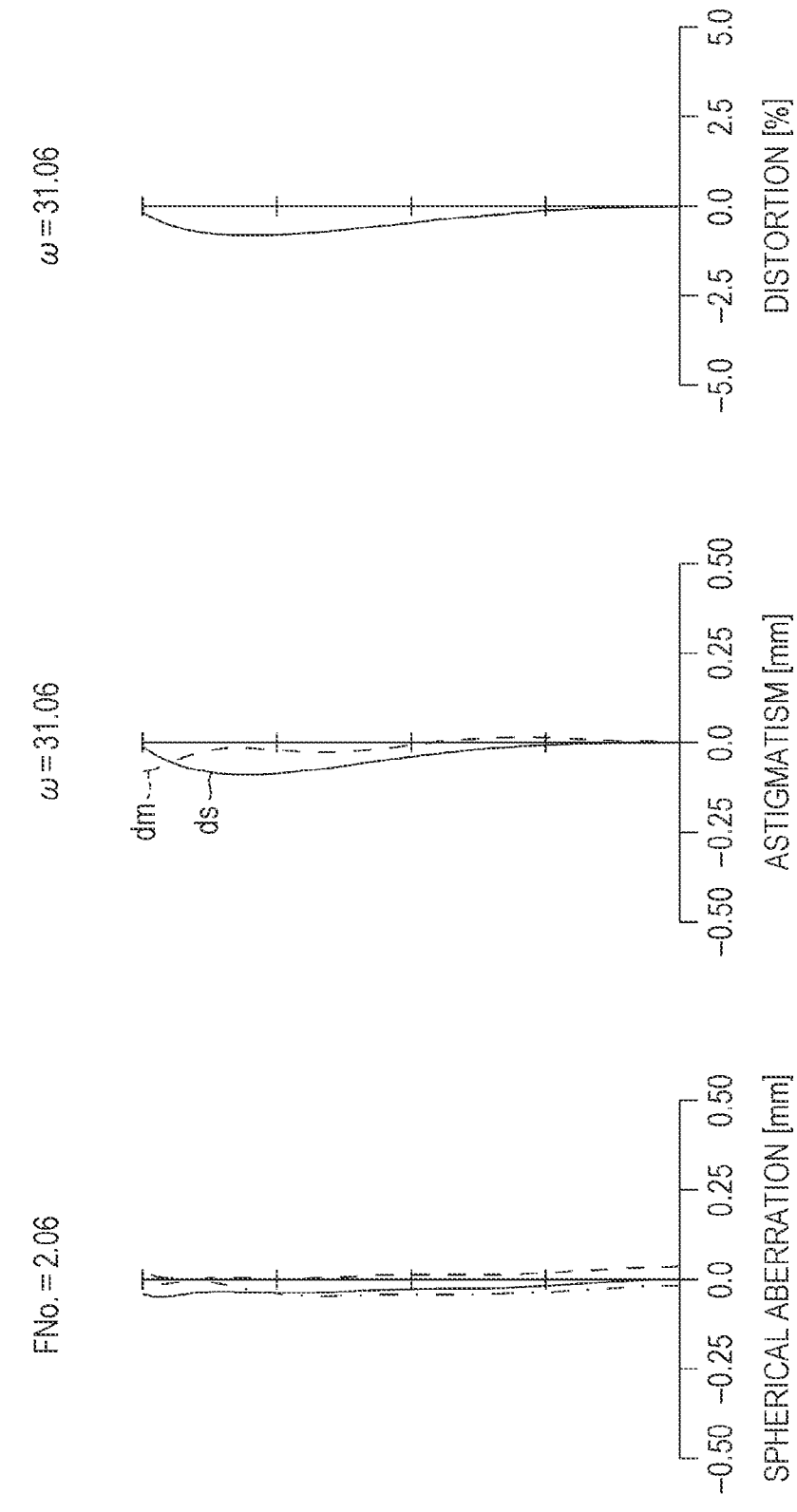
FIG. 22 is a spherical aberration diagram, an astigmatism diagram, and a distortion diagram at the wide-angle end of the zoom lens of Example 6 in an in-focus state on infinity.
Figure 23:
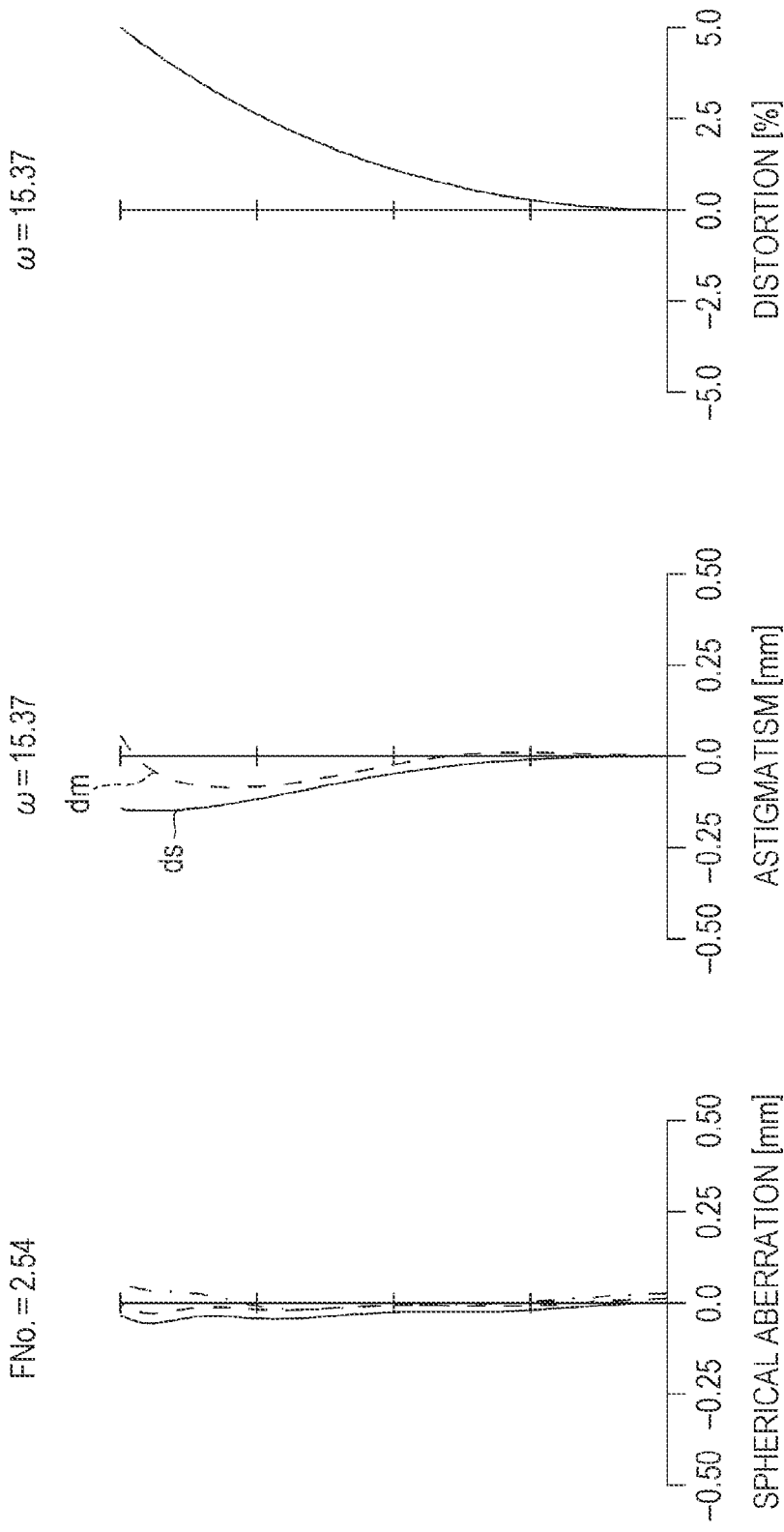
FIG. 23 is a spherical aberration diagram, an astigmatism diagram, and a distortion diagram at an intermediate focal length of the zoom lens of Example 6 in an in-focus state on infinity.

Next, numerical examples to which specific numerical values of the zoom lens are applied will be described. Hereinafter, "lens data", "specification table", "variable space", "lens group data", and "aspherical coefficient" are illustrated. FIGS. 22 to 24 illustrate longitudinal aberration diagrams of the zoom lens at the wide-angle end, the intermediate focal length, and the telephoto end in an in-focus state on infinity.

[Lens Data]

| Surface number | r | d | nd | vd |
|---|---|---|---|---|
| Object surface | ∞ | d(0) | | |
| 1 | 111.3081 | 1.5000 | 1.90366 | 31.31 |
| 2 | 75.1868 | 9.1566 | 1.49700 | 81.61 |
| 3 | 1104.9505 | 0.2000 | | |
| 4 | 83.4987 | 7.0088 | 1.49700 | 81.61 |
| 5 | 707.9086 | d(5) | | |
| 6ASPH | 88.0432 | 1.2000 | 1.88300 | 40.80 |
| 7 | 27.5361 | 11.1828 | | |
| 8 | −67.7941 | 1.2000 | 1.72916 | 54.67 |
| 9 | 31.7213 | 11.0000 | 1.85883 | 30.00 |
| 10 | −64.9764 | 3.8058 | | |
| 11 | −30.0221 | 1.2000 | 1.77250 | 49.60 |
| 12ASPH | −85.4425 | d(12) | | |
| 13S | ∞ | 1.2000 | | |
| 14 | 41.2797 | 4.5594 | 1.92286 | 20.88 |
| 15 | 138.5471 | 1.4012 | | |
| 16 | 33.6292 | 5.4561 | 1.65160 | 58.54 |
| 17 | 159.0629 | 0.2000 | | |
| 18 | 96.1876 | 1.2000 | 1.92286 | 20.88 |
| 19 | 24.1514 | 10.3340 | 1.59282 | 68.62 |
| 20 | −32.5362 | 1.2000 | 1.91082 | 35.25 |
| 21 | 74.8307 | 2.3933 | | |
| 22ASPH | −125.9493 | 1.2000 | 1.85135 | 40.10 |
| 23ASPH | 5000.0000 | 0.2000 | | |
| 24 | 31.7717 | 8.7182 | 1.61800 | 63.39 |
| 25 | −51.0249 | 0.2000 | | |
| 26ASPH | 153.7912 | 2.9699 | 1.80835 | 40.55 |
| 27ASPH | −85.7225 | d(27) | | |
| 28 | 56.9139 | 2.2573 | 1.92286 | 20.88 |
| 29 | 129.2802 | 0.9000 | 1.74320 | 49.34 |
| 30 | 20.9401 | d(30) | | |
| 31 | −76.4294 | 4.0000 | 1.67270 | 32.10 |
| 32 | −34.4896 | 5.3127 | | |
| 33ASPH | −20.4409 | 1.5000 | 1.74320 | 49.29 |
| 34ASPH | −67.4790 | d(34) | | |
| 35 | 869.1400 | 2.8174 | 1.78800 | 47.37 |
| 36 | −160.0237 | d(36) | | |
| 37 | ∞ | 2.5000 | 1.51680 | 64.20 |
| 38 | ∞ | 1.0000 | | |
| Image plane | ∞ | | | |

[Specification Table]

|  | Wide-angle end | Intermediate | Telephoto end |
|---|---|---|---|
| f | 36.0110 | 74.9870 | 145.7999 |
| FNo. | 2.0606 | 2.5369 | 2.9024 |
| ω | 31.0557 | 15.3703 | 8.1006 |
| Y | 21.6330 | 21.6330 | 21.6330 |

[Variable space]

|  | Wide-angle end | Intermediate | Telephoto end | Wide-angle end | Intermediate | Telephoto end |
|---|---|---|---|---|---|---|
| d(0) | ∞ | ∞ | ∞ | 634.4222 | 620.5667 | 589.4221 |
| d(5) | 1.0000 | 27.4974 | 55.8464 | 1.0000 | 27.4974 | 55.8464 |
| d(12) | 28.1486 | 6.5344 | 1.3000 | 28.1486 | 6.5344 | 1.3000 |
| d(27) | 1.4936 | 5.2182 | 1.4999 | 2.2959 | 7.9572 | 7.9516 |
| d(30) | 11.4620 | 12.2553 | 14.4639 | 10.6597 | 9.5163 | 8.0121 |
| d(34) | 1.0000 | 5.4543 | 14.9942 | 1.0000 | 5.4543 | 14.9942 |
| d(36) | 13.5000 | 13.5000 | 13.5000 | 13.5000 | 13.5000 | 13.5000 |

[Lens group data]

| Group No. | Focal length |
|---|---|
| G1 | 134.0890 |
| G2 | −28.2642 |
| G3 | 30.8961 |
| G4 | −50.7816 |
| G5 | −76.6750 |
| G6 | 171.7070 |

[Aspherical Coefficient]

| Surface number | k | A4 | A6 | A8 | A10 | A12 |
|---|---|---|---|---|---|---|
| 6 | 0.0000 | 7.30181E−07 | 8.32971E−10 | −7.95708E−13 | 3.13536E−15 | 0.00000E+00 |
| 12 | 0.0000 | −1.75869E−06 | −2.68675E−10 | 5.29718E−13 | −2.70231E−16 | 0.00000E+00 |
| 22 | 9.3117 | 4.31374E−06 | −6.68223E−08 | 1.16729E−10 | 1.24698E−13 | −2.13604E−16 |
| 23 | 0.0000 | 2.18602E−05 | −8.37130E−08 | 5.33051E−11 | 1.67136E−13 | 0.00000E+00 |
| 26 | 26.8006 | 6.75643E−06 | −6.84133E−08 | 3.82555E−10 | −2.67822E−12 | 5.84648E−15 |
| 27 | 0.0000 | 9.04944E−06 | −3.48419E−08 | 4.16286E−10 | −2.73040E−12 | 5.96512E−15 |
| 33 | 0.0000 | 1.33881E−05 | 2.09246E−08 | −1.08302E−10 | 3.04070E−13 | 0.00000E+00 |
| 34 | 0.0000 | 5.22704E−07 | −8.82903E−09 | −4.83789E−11 | 9.03529E−14 | 0.00000E+00 |

TABLE 1

| Example | 1 | 2 | 3 | 4 | 5 | 6 |
|---|---|---|---|---|---|---|
| (1) Σφi/φm | 0.698 | 0.765 | 1.266 | 0.926 | 0.529 | 0.724 |
| (2) Fnom | 1.141 | 1.067 | 1.122 | 1.085 | 1.328 | 1.073 |
| (3) Rmf/ft | 0.266 | 0.299 | 0.434 | 0.423 | 0.623 | 0.283 |
| (4) Rmb/ft | −0.267 | 0.752 | −0.537 | −0.531 | −0.766 | −0.588 |
| (5) θgF − (−1.618 × $10^{-3}$ × vd + 0.6415) | 0.0313 | 0.0313 | 0.0313 | 0.0313 | 0.0313 | 0.0313 |
| (6) vd | 20.88 | 20.88 | 20.88 | 20.88 | 20.88 | 20.88 |
| (7) BFw/Y | 0.746 | 0.746 | 0.746 | 0.746 | 0.746 | 0.746 |

TABLE 2

| Example | 1 | 2 | 3 | 4 | 5 | 6 |
|---|---|---|---|---|---|---|
| $\Sigma\varphi i$ | 0.0215 | 0.0243 | 0.0397 | 0.0304 | 0.0181 | 0.0234 |
| $\varphi m$ | 0.0309 | 0.0317 | 0.0313 | 0.0328 | 0.0341 | 0.0324 |
| Rmf | 38.639 | 43.552 | 63.211 | 61.715 | 63.471 | 41.28 |
| Rmb | −38.914 | 109.521 | −78.264 | −77.343 | −78.002 | −85.723 |
| $\theta gF$ | 0.639 | 0.639 | 0.639 | 0.639 | 0.639 | 0.639 |
| BFw | 16.148 | 16.148 | 16.148 | 16.148 | 16.148 | 16.148 |
| l1m | 19.953 | 18.655 | 56.424 | 52.727 | 46.493 | 18.758 |
| D | 17.486 | 17.485 | 50.273 | 48.598 | 35.015 | 17.476 |
| $\varphi LC1$ | 0.034 | 0.040 | 0.017 | 0.027 | 0.024 | 0.029 |
| $\varphi LC2$ | 0.053 | 0.021 | 0.010 | 0.021 | 0.039 | 0.043 |
| $\varphi LC3$ | 0.037 | 0.036 | 0.025 | 0.007 | 0.036 | 0.040 |
| $\varphi LC4$ | — | 0.015 | 0.026 | 0.018 | — | — |
| $\varphi LC5$ | — | — | 0.039 | 0.035 | — | — |
| $\varphi LC6$ | — | — | 0.010 | 0.008 | — | — |

In Table 1, Fnom represents an F value, from the first lens group to the intermediate group M, which is the smallest in the entire zoom region, and when Fnom=f1m/D, f1m represents a composite focal length from the first lens group to the intermediate group M at a position where Fnom indicates a minimum value in the entire zoom region, and D represents an entrance pupil diameter at a position where Fnom is minimum in the entire zoom region.

According to the present invention, it is possible to provide a zoom lens that is small as a whole and has excellent optical performance while having a large aperture ratio, and an imaging apparatus including the zoom lens.

What is claimed is:

1. A zoom lens comprising:
in order from an object side, a first lens group having positive refractive power, a second lens group having negative refractive power, an intermediate group M having one or more lens groups and having positive refractive power as a whole, a lens group F having negative refractive power, and a rear group R having one or more lens groups, wherein
the intermediate group M includes at least two lens surfaces Si each of which is a cemented surface and is a diverging surface,
a space between adjacent lens groups changes in zooming,
the lens group F moves on an optical axis in focusing, and
the zoom lens satisfies following Conditional Expression:

$$0.50 \leq \Sigma\varphi i/\varphi m \leq 1.50 \quad (1)$$

$$0.85 \leq Fnom \leq 1.40 \quad (2)$$

where
$\Sigma\varphi i$ is a sum of refractive power of the lens surfaces Si included in the intermediate group M,
where
for each lens surface Si (i=1, 2, . . . ) included in the intermediate group M, when refractive indexes of media before and after each lens surface Si with respect to d Line are Nfi and Nbi, and a radius of curvature of each lens surface Si is Ri, refractive power of each lens surface Si is $\varphi i=|(Nfi-Nbi)/Ri|(i=1, 2, ... )$,
$\varphi m$ is a combined refractive power of the intermediate group M at a telephoto end, and is a value obtained by $\varphi m=1/fm$,
fm is a composite focal length of the intermediate group M at the telephoto end, and Fnom is an F value from the first lens group to the intermediate group M and is a minimum value in an entire zoom region.

2. The zoom lens according to claim 1, wherein the rear group R has negative refractive power as a whole.

3. The zoom lens according to claim 1, wherein the rear group R includes at least one lens group having negative refractive power, and the lens group having negative refractive power moves toward an object in zooming from a wide-angle end to a telephoto end.

4. The zoom lens according to claim 1, wherein the first lens group moves toward an object in zooming from a wide-angle end to a telephoto end.

5. The zoom lens according to claim 1, wherein at least one face of the lens surfaces Si is convex toward an object.

6. The zoom lens according to claim 1, wherein
the zoom lens satisfies following Conditional Expression:

$$0.15 \leq Rmf/ft \leq 0.70 \quad (3)$$

where
Rmf is a radius of curvature of a lens surface, closest to an object, of the intermediate group M, and
ft is a focal length of the zoom lens at a telephoto end.

7. The zoom lens according to claim 1, wherein
the zoom lens satisfies following Conditional Expression:

$$-0.80 \leq Rmb/ft \leq -0.15 \quad (4)$$

where
Rmb is a radius of curvature of a lens surface, closest to an image, of the intermediate group M, and
ft is a focal length of the zoom lens at the telephoto end.

8. The zoom lens according to claim 1, wherein a lens surface, closest to an object, of the second lens group is convex toward the object.

9. The zoom lens according to claim 1, wherein the intermediate group M includes at least one air lens having negative refractive power.

10. The zoom lens according to claim 1, wherein
the intermediate group M includes a positive lens P at a position closest to an object, and
the positive lens P simultaneously satisfies following Conditional Expressions (5) and (6):

$$0.01 \leq \theta gF - (-1.618 \times 10^{-3} \times vd + 0.6415) \leq 0.06 \quad (5)$$

$$10 \leq vd \leq 35 \quad (6)$$

where
$\theta gF$ is a partial dispersion ratio of a material of the positive lens P with respect to g Line and F Line, and νd is an Abbe number of the material of the positive lens P with respect to d Line.

11. The zoom lens according to claim 1, wherein the zoom lens satisfies following Conditional Expression:

$$0.3 \leq BFw/Y \leq 1.5 \quad (7)$$

where

BFw is a back focus of the zoom lens at a wide-angle end, and is a value obtained by converting a cover glass thickness to an air conversion length, and Y is a maximum image height of the zoom lens.

12. An imaging apparatus comprising: the zoom lens according to claim 1; and an image sensor that converts an optical image formed on an image side of the zoom lens by the zoom lens into an electrical signal.

* * * * *